(12) United States Patent
Echigo et al.

(10) Patent No.: US 9,762,767 B2
(45) Date of Patent: Sep. 12, 2017

(54) IMAGING OPERATION TERMINAL, IMAGING SYSTEM, SOFTWARE EXTRACTION METHOD, AND COMPUTER-READABLE DEVICE

(71) Applicant: Olympus Corporation, Hachioji-shi, Tokyo (JP)

(72) Inventors: Hitoshi Echigo, Sagamihara (JP); Kensuke Ishii, Tokyo (JP); Saori Matsumoto, Tokyo (JP); Joji Sakamoto, Joensuu (FI); Yoshitaka Sato, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/192,154

(22) Filed: Jun. 24, 2016

(65) Prior Publication Data

US 2016/0309051 A1 Oct. 20, 2016

Related U.S. Application Data

(62) Division of application No. 14/197,587, filed on Mar. 5, 2014, now Pat. No. 9,426,347.

(30) Foreign Application Priority Data

Mar. 6, 2013 (JP) .................................. 2013-044584

(51) Int. Cl.
*G06F 9/445* (2006.01)
*H04N 1/00* (2006.01)
*H04N 5/232* (2006.01)

(52) U.S. Cl.
CPC ......... *H04N 1/00938* (2013.01); *H04N 5/232* (2013.01); *H04N 5/23209* (2013.01);
(Continued)

(58) Field of Classification Search
None
See application file for complete search history.

(56) References Cited

U.S. PATENT DOCUMENTS

| 5,949,433 A * | 9/1999 | Klotz ........................ G06T 3/40 345/419 |
| 6,704,864 B1 | 3/2004 | Philyaw |

(Continued)

FOREIGN PATENT DOCUMENTS

| JP | 2000-111994 | 4/2000 |
| JP | 2006-262211 | 9/2006 |
| JP | 2007-089093 | 4/2007 |
| JP | 2011-253058 | 12/2011 |

OTHER PUBLICATIONS

Japanese Office Action to corresponding Japanese Patent Application No. 2013-044584 mailed on Jan. 13, 2015 (4 pgs.) with translation (5 pgs.).

(Continued)

*Primary Examiner* — Evral E Bodden
(74) *Attorney, Agent, or Firm* — John C. Pokotylo; Straub & Pokotylo

(57) ABSTRACT

An imaging operation terminal includes: a storage section which stores software identification information for identifying imaging and editing software which performs at least one of an operation relating to imaging of an imaging module mounting an optical module and to editing of an image imaged by the imaging module in association with each combination of imaging module identification information for identifying imaging module and optical module identification information for identifying optical module; a communicating section which wirelessly receives the imaging module identification information for identifying the imaging module and the optical module identification information for identifying the optical module mounted to the imaging module from the imaging module when establish- (Continued)

ing wireless connection with the imaging module; and a software extracting section which extracts the software identification information corresponding to the combination of imaging module identification information and optical module identification information received by the communicating section from the storage section.

9 Claims, 35 Drawing Sheets

(52) U.S. Cl.
CPC ..... *H04N 5/23222* (2013.01); *H04N 5/23245* (2013.01); *H04N 5/23206* (2013.01); *H04N 2201/0084* (2013.01)

(56) References Cited

U.S. PATENT DOCUMENTS

| | | |
|---|---|---|
| 8,225,312 B2 | 7/2012 | DiCarlo et al. |
| 8,605,974 B2 | 12/2013 | Liang et al. |
| 2007/0094658 A1* | 4/2007 | DiCarlo ................ G06F 8/65 717/178 |

OTHER PUBLICATIONS

Japanese Office Action to corresponding Japanese Patent Application No. 2015-126804, mailed on May 17, 2016 (4 pgs.) with translation (5 pgs.).

\* cited by examiner

FIG. 1

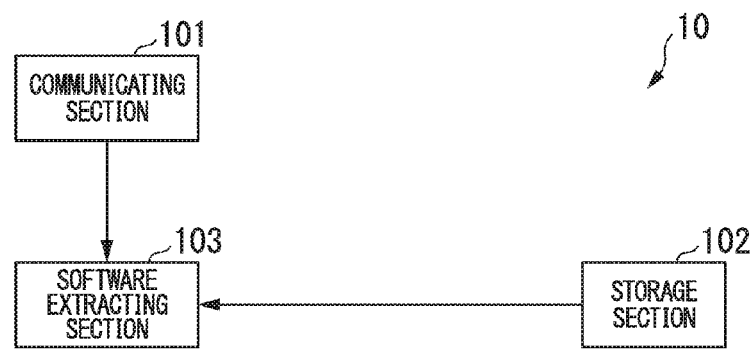

FIG. 2

| IMAGING MODULE IDENTIFICATION INFORMATION | OPTICAL MODULE IDENTIFICATION INFORMATION | SOFTWARE IDENTIFICATION INFORMATION |
|---|---|---|
| 3D IMAGING MODULE | MACRO LENS | 3D CREATION SOFTWARE |
| NORMAL IMAGING MODULE | MACRO LENS | ALBUM CREATION SOFTWARE |
| HIGH-SENSITIVITY IMAGING MODULE | PORTRAIT LENS | PERSON DETECTION SOFTWARE |
| HIGH-SENSITIVITY IMAGING MODULE | WIDE-ANGLE LENS | CONSTELLATION SEARCH SOFTWARE |

FIG. 7

| IMAGING MODULE IDENTIFICATION INFORMATION | OPTICAL MODULE IDENTIFICATION INFORMATION | SOFTWARE IDENTIFICATION INFORMATION |
|---|---|---|
| HIGH-SENSITIVITY IMAGING MODULE | WIDE-ANGLE LENS | NIGHT VIEW PHOTOGRAPHING SOFTWARE CONSTELLATION SEARCH SOFTWARE |
| HIGH-ACCURACY IMAGING MODULE | LOW F-VALUE LENS | ALBUM SOFTWARE WEB CONTRIBUTION SOFTWARE IMAGE PROCESSING SOFTWARE |

| IMAGING MODULE IDENTIFICATION INFORMATION | OPTICAL MODULE IDENTIFICATION INFORMATION | SOFTWARE IDENTIFICATION INFORMATION |
|---|---|---|
| HIGH-SENSITIVITY IMAGING MODULE | WIDE-ANGLE LENS | ------- |
| HIGH-ACCURACY IMAGING MODULE | LOW F-VALUE LENS | ------- |

| IMAGING MODULE IDENTIFICATION INFORMATION AND OPTICAL MODULE IDENTIFICATION INFORMATION | SOFTWARE IDENTIFICATION INFORMATION |
|---|---|
| MICRO FOUR THIRDS MODULE AND LENS | 3D SOFTWARE PANORAMA SOFTWARE |
| MICRO FOUR THIRDS MODULE AND LENS | |
| MICRO FOUR THIRDS MODULE AND TELEPHOTO LENS | IMAGE PARTIAL ENLARGMENT SOFTWARE |
| MICRO FOUR THIRDS MODULE AND WIDE-ANGLE LENS | |

| IMAGING MODULE IDENTIFICATION INFORMATION | OPTICAL MODULE IDENTIFICATION INFORMATION | SOFTWARE IDENTIFICATION INFORMATION | PRIORITY LEVEL |
|---|---|---|---|
| IMAGING MODULE A | OPTICAL MODULE A | IMAGING OPERATION SOFTWARE 1 | 2 |
| | | IMAGING OPERATION SOFTWARE 2 | 1 |
| | | EDITING SOFTWARE 3 | 3 |
| IMAGING MODULE B | OPTICAL MODULE B | EDITING SOFTWARE 4 | 4 |
| | | IMAGING OPERATION SOFTWARE 5 | 2 |
| | | EDITING SOFTWARE 6 | 3 |
| | | IMAGING OPERATION SOFTWARE 7 | 1 |

| NUMBER OF STARTS | SCORE |
|---|---|
| 30 OR MORE | 20 |
| 20 TO 29 | 10 |
| 10 TO 19 | 5 |
| 9 OR LESS | 0 |

T7

| NUMBER OF STARTS IN DESCENDING ORDER | SCORE |
|---|---|
| FIRST RANK | 20 |
| SECOND RANK | 10 |
| THIRD TO FIFTH RANKS | 5 |
| SIXTH RANK OR LESS | 0 |

T8

| USER DESIGNATION RANK | SCORE |
|---|---|
| FIRST RANK | 20 |
| SECOND RANK | 15 |
| THIRD RANK | 10 |
| FOURTH RANK OR LESS | 0 |

T9

| INSTALLATION DATE | SCORE |
|---|---|
| WITHIN LAST 5 DAYS | 20 |
| WITHIN LAST 6 TO 15 DAYS | 10 |
| WITHIN LAST 16 TO 30 DAYS | 5 |
| WITHIN LAST 30 DAYS OR MORE | 0 |

T10

| USE HISTORY | SCORE |
|---|---|
| IMMEDIATELY PREVIOUS TIME | 10 |
| ONE TIME BEFORE PREVIOUS TIME | 5 |
| TWO TIMES BEFORE PREVIOUS TIME | 0 |

FIG. 17

| SOFTWARE IDENTIFICATION INFORMATION | NUMBER OF STARTS | USER DESIGNATION RANK | INSTALLATION DATE | USE HISTORY | OTHER FACTORS | TOTAL | PRIORITY LEVEL |
|---|---|---|---|---|---|---|---|
| SOFTWARE 1 | 10 | 5 | 5 | 0 | 0 | 20 | 2 |
| SOFTWARE 2 | 20 | 10 | 10 | 10 | 5 | 55 | 1 |
| SOFTWARE 3 | 5 | 0 | 5 | 0 | 0 | 10 | 3 |
| ... | ... | ... | ... | ... | ... | ... | ... |

BEFORE CHANGE

ON ADDITION

T12

| IMAGING MODULE IDENTIFICATION INFORMATION | OPTICAL MODULE IDENTIFICATION INFORMATION | SOFTWARE IDENTIFICATION INFORMATION |
|---|---|---|
| HIGH-SENSITIVITY IMAGING MODULE | PORTRAIT LENS | NIGHT VIEW SOFTWARE |
| HIGH-SENSITIVITY IMAGING MODULE | WIDE-ANGLE LENS | NIGHT VIEW SOFTWARE |

DELETION

T14

| IMAGING MODULE IDENTIFICATION INFORMATION | OPTICAL MODULE IDENTIFICATION INFORMATION | SOFTWARE IDENTIFICATION INFORMATION |
|---|---|---|
| HIGH-SENSITIVITY IMAGING MODULE | PORTRAIT LENS | NIGHT VIEW SOFTWARE |
| HIGH-SENSITIVITY IMAGING MODULE | WIDE-ANGLE LENS | NIGHT VIEW SOFTWARE CONSTELLATION SEARCH SOFTWARE |

AFTER CHANGE

T13

| IMAGING MODULE IDENTIFICATION INFORMATION | OPTICAL MODULE IDENTIFICATION INFORMATION | SOFTWARE IDENTIFICATION INFORMATION |
|---|---|---|
| HIGH-SENSITIVITY IMAGING MODULE | PORTRAIT LENS | NIGHT VIEW SOFTWARE |
| HIGH-SENSITIVITY IMAGING MODULE | WIDE-ANGLE LENS | NIGHT VIEW SOFTWARE CONSTELLATION SEARCH SOFTWARE |

T15

| IMAGING MODULE IDENTIFICATION INFORMATION | OPTICAL MODULE IDENTIFICATION INFORMATION | SOFTWARE IDENTIFICATION INFORMATION |
|---|---|---|
| HIGH-SENSITIVITY IMAGING MODULE | PORTRAIT LENS | — |
| HIGH-SENSITIVITY IMAGING MODULE | WIDE-ANGLE LENS | CONSTELLATION SEARCH SOFTWARE |

| IMAGING MODULE IDENTIFICATION INFORMATION | OPTICAL MODULE IDENTIFICATION INFORMATION | ACCESSORY IDENTIFICATION INFORMATION | SOFTWARE IDENTIFICATION INFORMATION |
|---|---|---|---|
| HIGH-SENSITIVITY IMAGING MODULE | LENS | FLASH | IMAGE SYNTHESIZING SOFTWARE ISO MANAGEMENT SOFTWARE |
| IMAGING MODULE | TELEPHOTO LENS | ELECTRIC CAMERA PLATFORM | TRAILING SOFTWARE |
| IMAGING MODULE | LENS | TRIPOD | IMAGE STABILIZATION SWITCHING SOFTWARE |

IMAGING OPERATION TERMINAL, IMAGING SYSTEM, SOFTWARE EXTRACTION METHOD, AND COMPUTER-READABLE DEVICE

CROSS-REFERENCE TO RELATED APPLICATIONS

This application is a divisional application of U.S. patent application Ser. No. 14/197,587 (referred to as "the '587 application" and incorporated herein by reference), filed on Mar. 5, 2014, titled "IMAGING OPERATION TERMINAL, IMAGING SYSTEM, SOFTWARE EXTRACTION METHOD, AND COMPUTER-READABLE DEVICE," and listing Hitoshi Echigo, Kensuke Ishii, Saori Matsumoto, Joji Sakamoto and Yoshitaka Sato as the inventors, the '587 being based upon and claiming the benefit of priority from prior Japanese Patent Application No. 2013-044584, filed Mar. 6, 2013, the entire contents of which are incorporated herein by reference.

BACKGROUND OF THE INVENTION

Field of the Invention

The present invention relates to an imaging operation terminal, an imaging system, a software extraction method, and a computer-readable device.

Priority is claimed on Japanese Patent Application No. 2013-044584, filed on Mar. 6, 2013, the contents of which are incorporated herein by reference.

Description of Related Art

In the related art, a variety of software used to operate of imaging of a digital camera and to edit of an image obtained by the imaging has been proposed. A technique of performing photographing by remote operation with the digital camera being connected to a computer or transmitting an image, which is obtained by the photographing using the digital camera, to the computer to manage the image has been used. Japanese Unexamined Patent Application, First Publication No. 2007-89093 discloses a terminal apparatus that acquires an operation mode of a camera device and a cradle device and automatically determines and starts an application to be executed in the terminal apparatus according to the acquired operation mode.

SUMMARY OF THE INVENTION

According to a first aspect of the invention, there is provided an imaging operation terminal including: a storage section which stores a software identification information used to identify imaging and editing software which performs at least one of an operation relating to imaging of an imaging module which mounts an optical module and editing of an image imaged by the imaging module in association with each combination of an imaging module identification information used to identify the imaging module and an optical module identification information used to identify the optical module; a communicating section which wirelessly receives the imaging module identification information used to identify the imaging module and the optical module identification information used to identify the optical module which is mounted to the imaging module from the imaging module wirelessly when wireless connection with the imaging module is established; and a software extracting section which extracts the software identification information which corresponds to the combination of the imaging module identification information and the optical module identification information, which is received by the communicating section, from the storage section.

According to a second aspect of the invention, in the imaging operation terminal according to the first aspect of the invention, the storage section may store the plurality of the software identification information and each combination of the imaging module identification information and the optical module identification information, each of the plurality of the software identification information being associated with each priority level information which indicates a priority level of the imaging and editing software among a plurality of the imaging and editing software indicated by the plurality of the software identification information, and the software extracting section may extract one of the plurality of the software identification information from the plurality of the software identification information which corresponds to the combination of the imaging module identification information and the optical module identification information, which are received by the communicating section, based on the priority levels associated with each of the plurality of the software identification information.

According to a third aspect of the invention, the imaging operation terminal according to the second aspect of the invention may further include a priority level assigning section which determines the priority levels among the plurality of the imaging and editing software indicated by the plurality of the software identification information based on a predetermined factor, with respect to the plurality of the software identification information which is associated with each combination of the imaging module identification information and the optical module identification information, and which stores the determined priority levels in the storage section.

According to a fourth aspect of the invention, in the imaging operation terminal according to the third aspect of the invention, the predetermined factor may be at least one of the following: a number of starts of the imaging and editing software, a rank designation of a user for the imaging and editing software, a use history of the imaging and editing software and an installation date of the imaging and editing software.

According to a fifth aspect of the invention, in the imaging operation terminal according to the third or fourth aspect of the invention, the priority level assigning section may determine the priority levels at the latest before the time when the software extracting section extracts the software identification information, and stores the determined priority levels in the storage section.

According to a sixth aspect of the invention, the imaging operation terminal according to any one of the first to fifth aspects of the invention may further include: a display section which displays a list of the imaging and editing software indicated by the plurality of software identification information extracted by the software extracting section; an operating section which accepts an operation of selecting any one of the imaging and editing software which is list-displayed by the display section; and a software starting section which starts the imaging and editing software selected by the operation accepted by the operating section.

According to a seventh aspect of the invention, the imaging operation terminal according to any one of the first to sixth aspects of the invention may further include an information updating section which updates at least one of the software identification information, the imaging module identification information and the optical module identification information, which are stored in the storage section.

According to an eighth aspect of the invention, the imaging operation terminal according to the seventh aspect of the invention may further include a detecting section which detects a new installation of imaging and editing software in the imaging operation terminal, or a deletion of imaging and editing software installed in the imaging operation terminal, and the information updating section may update the software identification information stored in the storage section when the detecting section detects the new installation or the deletion.

According to a ninth aspect of the invention, the imaging operation terminal according to the seventh aspect of the invention may further include a detecting section which detects a nonexistence of at least one of the imaging module identification information and the optical module identification information received by the communicating section is not present in the imaging module identification information and the optical module identification information stored in the storage section, and the information updating section may additionally store a set of the imaging module identification information and the optical module identification information received by the communicating section in the storage section, when the detecting section detects the nonexistence.

According to a tenth aspect of the invention, in the imaging operation terminal according to the ninth aspect of the invention, the detecting section may extract imaging and editing software which corresponds to the imaging module identification information or the optical module identification information, which is not stored in the storage section, from an external database when the detecting section detects the nonexistence of at least one of the imaging module identification information and the optical module identification information, which are received by the communicating section, in the imaging module identification information and the optical module identification information stored in the storage section, and may download and install the extracted imaging and editing software.

According to an eleventh aspect of the invention, in the imaging operation terminal according to the first aspect of the invention, the imaging operation terminal may further include a software extracting section which extracts software identification information corresponding to the combination of the imaging module identification information, the optical module identification information and the accessory identification information received by the communicating section from the storage section, the storage section may store in association a set of the imaging module identification information, the optical module identification information and the software identification information with accessory identification information used to identify an accessory used together with the imaging module to be stored, and the communicating section may further receive the accessory identification information used to identify the accessory used together with the imaging module when the communicating section wirelessly receives the imaging module identification information and the optical module identification information.

According to a twelfth aspect of the invention, in the imaging operation terminal according to the eleventh aspect of the invention, the communicating section may wirelessly receive the accessory identification information from the imaging module when wireless connection with the imaging module is established.

According to a thirteenth aspect of the invention, in the imaging operation terminal according to the twelfth aspect of the invention, the communication section may wirelessly receive the accessory identification information from the accessory when wireless connection with the accessory is established.

According to a fourteenth aspect of the invention, the imaging operation terminal according to any one of the eleventh to thirteenth aspects of the invention may further include: a detecting section which detects a reception of the accessory identification information which is not stored in the storage section by the communication section; and an information updating section which updates the accessory identification information, which is stored in the storage section, when the detecting section detects the reception.

According to a fifteenth aspect of the invention, there is provided an imaging system which includes an imaging module which mounts an optical module, and an imaging operation terminal which operates the imaging module, the imaging operation terminal including: a storage section which stores software identification information used to identify imaging and editing software which performs at least one of an operation relating to imaging of an imaging module which mounts an optical module and editing of an image imaged by the imaging module in association with each combination of imaging module identification information used to identify the imaging module and optical module identification information used to identify the optical module; a communicating section receives, when wireless connection with the imaging module is established, the imaging module identification information used to identify the imaging module and the optical module identification information used to identify the optical module which is mounted to the imaging module from the imaging module wirelessly; and a software extracting section which extracts the software identification information, which corresponds to the combination of the imaging module identification information and the optical module identification information received by the communicating section, from the storage section.

According to a sixteenth aspect of the invention, there is provided a software extraction method in an imaging operation method performed by an imaging operation terminal including a storage section which stores software identification information used to identify imaging and editing software which performs at least one of an operation which is related to imaging of an imaging module which mounts an optical module and editing of an image imaged by the imaging module in association with each combination of imaging module identification information used to identify the imaging module and optical module identification information used to identify the optical module, the software extraction method including steps of: receiving, when wireless connection with the imaging module is established, the imaging module identification information used to identify the imaging module and the optical module identification information used to identify the optical module which is mounted to the imaging module from the imaging module wirelessly by a communicating section; and extracting the software identification information which corresponds to the combination of the imaging module identification information and the optical module identification information received by the communicating section from the storage section by a software extracting section.

According to a seventeenth aspect of the invention, there is provided a computer-executable device storing a program which causes an imaging operation terminal including a storage section which stores software identification information used to identify imaging and editing software which performs at least one of an operation which is related to imaging of an imaging module which mounts an optical module and an operation which is related to editing of an image imaged by the imaging module in association with each combination of imaging module identification information used to identify the imaging module and optical module identification information used to identify the optical module to perform steps of: a communication step of receiving, when wireless connection with the imaging module is established, the imaging module identification information used to identify the imaging module and the optical module identification information used to identify the optical module which is mounted to the imaging module from the imaging module wirelessly; and an extraction step of extracting the software identification information which corresponds to the combination of the imaging module identification information and the optical module identification information received in the communication step from the storage section.

BRIEF DESCRIPTION OF THE DRAWINGS

FIG. 1 is a block diagram schematically illustrating a configuration of an imaging operation terminal according to a first embodiment.

FIG. 2 is a table T1 illustrating an example of software-specific information stored in a storage section.

FIG. 7 is a table T2 illustrating an example of software-specific information stored in a storage section according to Modification Example 2.

FIG. 8 is a table T3 illustrating an example of software-specific information stored in a storage section according to Modification Example 2.

FIG. 10 is a table T4 illustrating an example of software-specific information stored in a storage section according to Modification Example 3.

FIG. 13 is a table T5 illustrating an example of software-specific information stored in a storage section according to Modification Example 4.

FIG. 16 is a diagram illustrating examples of conversion tables of values and scores for each factor.

FIG. 17 is a diagram illustrating an example of a table T11 that a priority level assigning section creates to determine the priority level of software.

FIG. 24 shows an example of software-specific information before change and after change.

FIG. 31 is a table T16 illustrating an example of software-specific information stored in a storage section.

DETAILED DESCRIPTION OF THE INVENTION

First Embodiment

Figure 3:
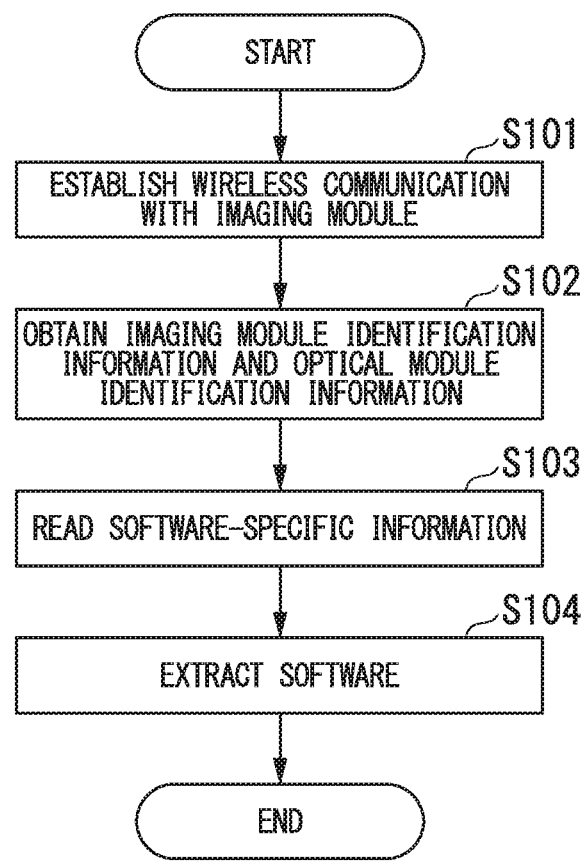
FIG. 3 is a flowchart illustrating an example of the flow of processes of the imaging operation terminal according to the first embodiment.

Hereinafter, embodiments of the invention will be described with reference to the accompanying drawings.

FIG. 1 is a block diagram schematically illustrating a configuration of an imaging operation terminal 10 according to a first embodiment. The imaging operation terminal 10 includes a communicating section 101, a storage section 102 and a software extracting section 103. The imaging operation terminal 10 corresponds to a multifunctional portable terminal (so-called smart phone), a tablet terminal, an electronic book browsing terminal, a notebook computer or a personal computer, for example.

The communicating section 101 receives, when wireless connection with an imaging module (not shown) is established, imaging module identification information used to identify the imaging module and optical module identification information used to identify an optical module (not shown) which is mounted to the imaging module wirelessly. Here, the imaging module includes at least an image sensor (for example, a CCD) that converts light guided from the optical module into an electrical signal and a communicating section capable of communicating with the imaging operation terminal 10. The optical module includes at least an optical system (for example, a lens) that guides light incidents from the outside to the imaging module. The communicating section 101 outputs the received imaging module identification information and optical module identification information to the software extracting section 103.

Software-specific information is stored in the storage section 102. In the software-specific information, software identification information used to identify imaging and editing software is associated with each combination of the imaging module identification information used to identify the imaging module and the optical module identification information used to identify the optical module. Here, the imaging and editing software performs at least one of an imaging operation of the imaging module which mounts the optical module and editing of an image imaged by the imaging module. In the present embodiment, an example of the imaging operation includes an operation of the imaging module. The imaging operation may include an operation of an accessory used together with the imaging module, in addition to the operation of the imaging module.

The software extracting section 103 extracts the software identification information corresponding to the combination of the imaging module identification information and the optical module identification information received by the communicating section 101 from the storage section 102. Specifically, for example, the software extracting section 103 reads the software-specific information stored in the storage section 102. Then, the software extracting section 103 extracts the software identification information corresponding to the combination of the imaging module identification information and the optical module identification information received by the communicating section 101 from the read software-specific information.

FIG. 2 is a table T1 illustrating an example of the software-specific information stored in the storage section 102. In the table T1, sets of imaging module identification information, optical module identification information and software identification information are shown. For example, on the first line of the table T1, when the imaging module identification information is a 3D imaging module and the optical module identification information is a macro lens, 3D creation software as the software identification information is associated therewith. Here, a process of the software extracting section 103 will be described using the data on the first line of the table T1. For example, when the communicating section 101 receives the 3D imaging module as the imaging module identification information and the macro lens as the optical module identification information, the software extracting section 103 extracts the 3D creation software as the software-specific information with reference to the information on the first line of the table T1.

In the table T1, person detection software and constellation search software are examples of imaging operation software. On the other hand, album creation software and the 3D creation software are examples of editing software.

In the example in FIG. 2, even though the same macro lens is used as the optical module, if the imaging module is the 3D imaging module that obtains depth-directional information, the software extracting section 103 extracts the 3D creation software corresponding to creation of a 3D image. When the same high-sensitivity imaging module is used as the imaging module, if the optical module is a portrait lens suitable for photographing a person, there is a possibility of photographing a person in an environment with a small light intensity, and thus, the software extracting section 103 extracts the person detection software. On the other hand, when the high-sensitivity imaging module is used, the optical module is a wide-angle lens capable of performing photographing at a wide angle, there is a possibility of photographing a night sky, and thus, the software extracting section 103 extracts the constellation search software. In this way, since the software suitable for the combination of the imaging module and the optical module is stored in the storage section 102 in advance, the software extracting section 103 can extract software with a high possibility of use by a user.

The imaging module may be a high accuracy module, a module with a large image sensor, a module with a high pixel density, or the like. Further, the optical module may be a fish-eye lens, a telephoto lens, a zoom lens, a telephoto optical system, a microscope optical system, or the like. Similarly, the software is not limited to the example shown in FIG. 2, and a variety of software may be used.

FIG. 3 is a flowchart illustrating an example of the flow of processes of the imaging operation terminal 10 according to the first embodiment.

First, in step S101, the communicating section 101 establishes wireless connection with the imaging module which mounts the optical module.

Then, in step S102, the communicating section 101 obtains the imaging module identification information used to identify the imaging module and the optical module identification information used to identify the optical module which is mounted to the imaging module, from the imaging module.

Then, in step S103, the software extracting section 103 reads the software-specific information stored in the storage section 102.

Then, in step S104, the software extracting section 103 extracts the software identification information corresponding to the combination of the imaging module identification information and the optical module identification information received by the communicating section 101, from the software-specific information. Here, the processes of the present flowchart end.

As described above, in the imaging operation terminal 10 according to the first embodiment, the software extracting section 103 can extract the software identification information corresponding to the combination of the imaging module identification information received by the communicating section 101. Thus, the imaging operation terminal 10 can select software suitable for the combination of the imaging module and the optical module, and it is thus possible to reduce an effort of a user for software selection.

Modification Example 1

Figure 4:
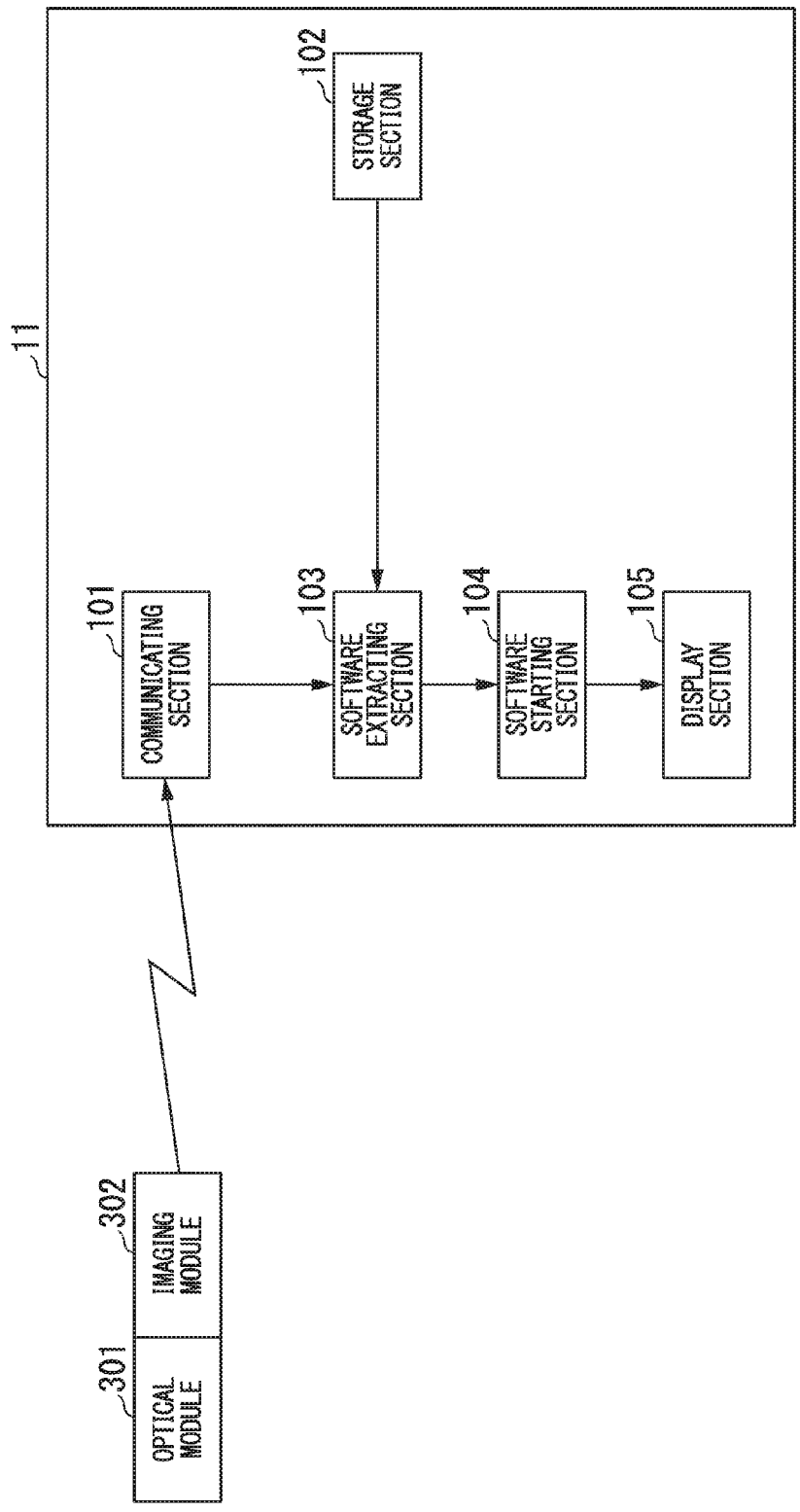
FIG. 4 is a block diagram schematically illustrating a configuration of an imaging operation terminal according to Modification Example 1 of the first embodiment.

Subsequently, Modification Example 1 of the first embodiment will be described. FIG. 4 is a block diagram schematically illustrating a configuration of an imaging operation terminal 11 according to Modification Example 1 of the first embodiment. The same reference numerals are given to the same components as in FIG. 1, and a detailed description thereof will not be repeated here. The configuration of the imaging operation terminal 11 according to Modification Example 1 is different from the configuration of the imaging operation terminal 10 according to the first embodiment in that a software starting section 104 and a display section 105 are additionally provided.

An imaging module 302 is provided with an optical module 301 as an example. The optical module 301 includes, for example, an electrically rewritable non-volatile memory (not shown), in which optical module identification information used to identify the optical module 301 is stored in advance. Whether the imaging module 302 is which mounts the optical module 301 may be detected by providing a detachable detection switch (not shown) in the vicinity of an opening part used to mount formed in the imaging module 302. If the mounting of the optical module 301 is detected, the imaging module 302 supplies power to the optical module 301 through a contact (not shown) of the imaging module 302 and a contact (not shown) of the optical module 301. The optical module 301 transmits, when supplied with the power, the optical module identification information stored in the non-volatile memory to the imaging module 302 through the contact (not shown) provided in the optical module 301. Thus, the imaging module 302 obtains the optical module identification information used to identify the optical module 301, and retains the obtained optical module identification information.

The imaging module 302 includes a communicating section (not shown), and the communicating section of the imaging module 302 can perform wireless communication with the communicating section 101 of the imaging operation terminal 11.

The software starting section 104 starts software extracted by the software extracting section 103, generates a screen signal indicating a screen of the software, and outputs the generated screen signal to the display section 105.

The display section 105 displays the screen of the software from the screen signal inputted from the software starting section 104.

Figure 5:
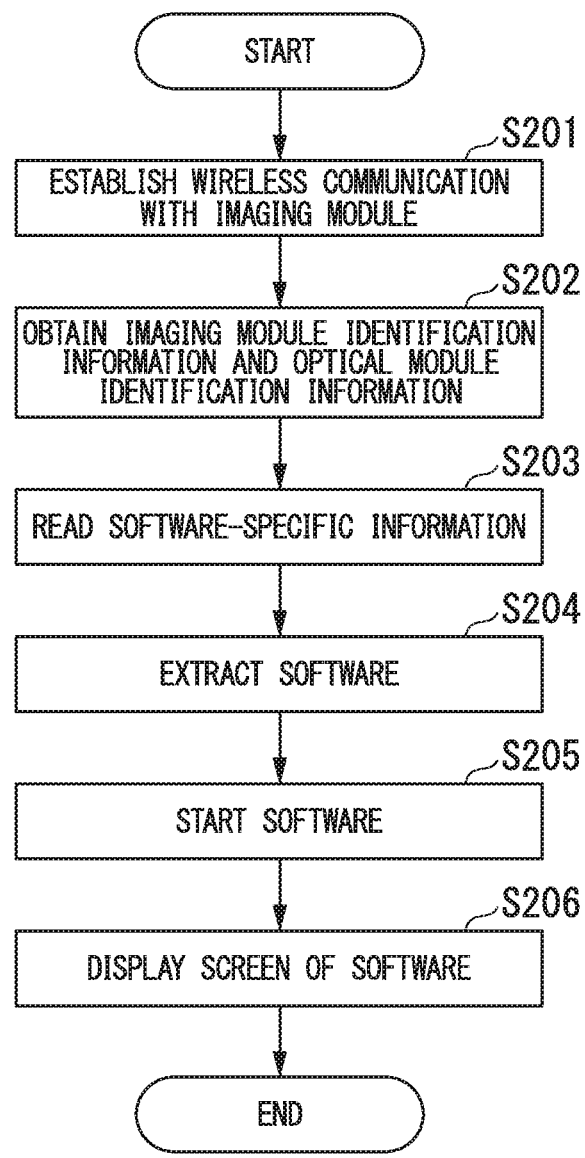
FIG. 5 is a flowchart illustrating an example of the flow of processes of the imaging operation terminal according to Modification Example 1 of the first embodiment.

FIG. 5 is a flowchart illustrating an example of the flow of processes of the imaging operation terminal according to Modification Example 1 of the first embodiment.

First, in step S201, the communicating section 101 establishes wireless connection with the imaging module 302 which mounts the optical module 301.

Then, in step S202, the communicating section 101 obtains the imaging module identification information used to identify the imaging module 302 and the optical module identification information used to identify the optical module which is mounted to the imaging module 302, from the imaging module 302.

Then, in step S203, the software extracting section 103 reads the software-specific information stored in the storage section 102.

Then, in step S204, the software extracting section 103 extracts the software identification information corresponding to the combination of the imaging module identification information and the optical module identification information received by the communicating section 101, from the software-specific information stored in the storage section 102.

Then, in step S205, the software starting section 104 starts imaging and editing software identified by the software identification information extracted by the software extracting section 103.

Then, in step S206, the display section 105 displays the screen of the imaging and editing software started by the software starting section 104. Here, the processes of the present flowchart end.

As described above, in Modification Example 1, in addition to the effects of the first embodiment, since the software starting section 104 starts the imaging and editing software extracted by the software extracting section 103, in the case that the imaging and editing software is imaging operation software, it is possible to reduce time used for imaging preparation. In the case that the imaging and editing software is editing software, it is possible to reduce the time used for image editing preparation.

Modification Example 2

Figure 6:
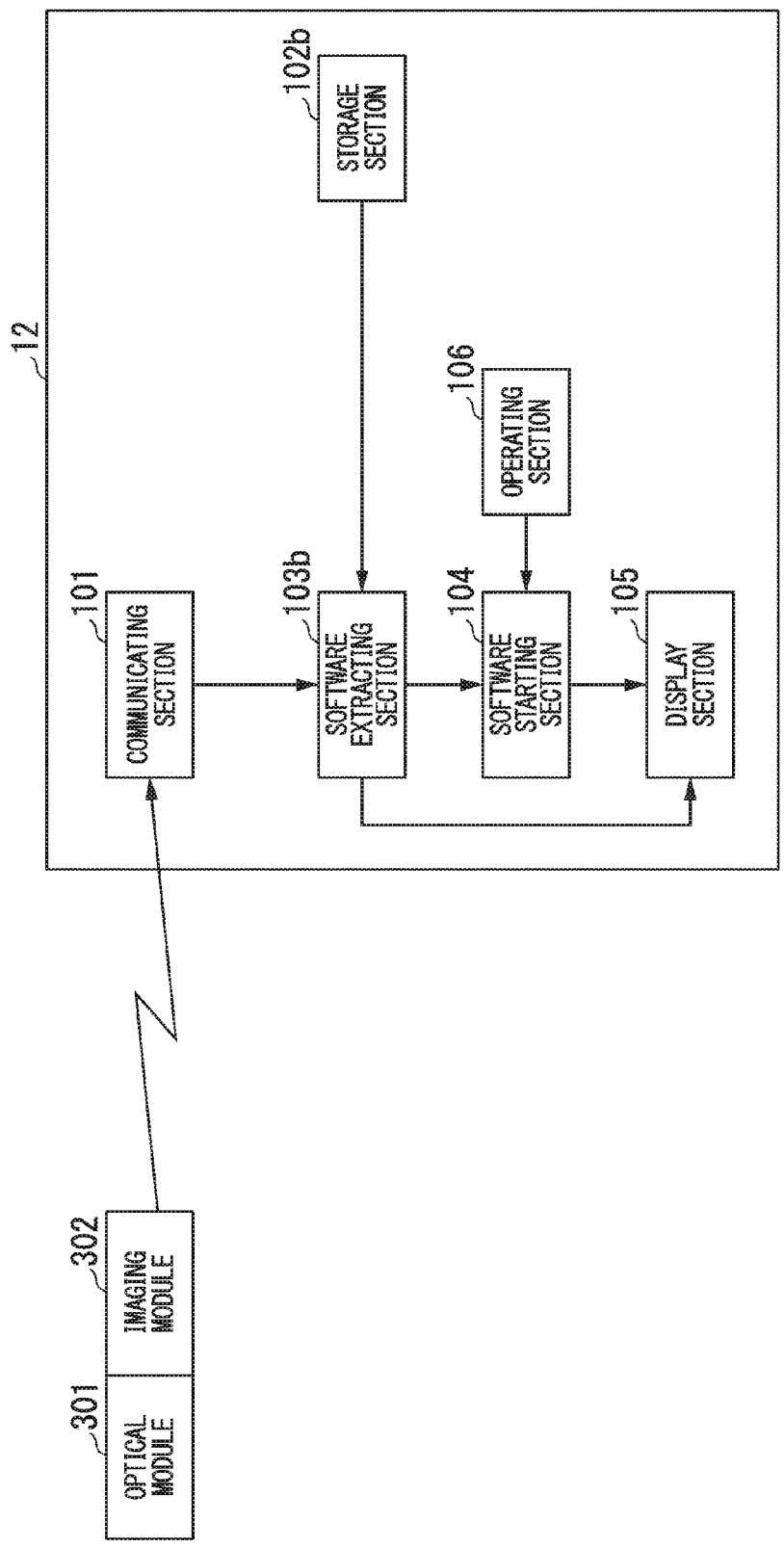
FIG. 6 is a block diagram schematically illustrating a configuration of an imaging operation terminal 12 according to Modification Example 2 of the first embodiment.

Subsequently, Modification Example 2 of the first embodiment will be described. An imaging operation terminal 12 of Modification Example 2 extracts, if there are a plurality of imaging and editing software suitable for a situation, a plurality of imaging and editing software. FIG. 6 is a block diagram schematically illustrating a configuration of the imaging operation terminal 12 according to Modification Example 2 of the first embodiment. The same reference numerals are given to the same components as in FIG. 4, and a detailed description thereof will not be repeated here. The configuration of the imaging operation terminal 12 according to Modification Example 2 is different from the configuration of the imaging operation terminal 11 according to Modification Example 1 in that the storage section 102 is changed to a storage section 102b, the software extracting section 103 is changed to a software extracting section 103b and an operating section 106 is additionally provided.

In the storage section 102b, a plurality of software identification information corresponding to a combination of imaging module identification information and optical module identification information are stored in association therewith.

The software extracting section 103b reads the plural the software identification information corresponding to the set of the imaging module identification information and the optical module identification information received by the communicating section 101 from the storage section 102b. Specifically, for example, the software extracting section 103b reads software-specific information, and extracts the plurality of software identification information corresponding to the set of the imaging module identification information and the optical module identification information received by the communicating section 101, based on the software-specific information. The software extracting section 103b displays names of imaging and editing software identified by the read plurality of software identification information in the display section 105, for example.

The operating section 106 receives a user operation used to select the name of one imaging and editing software from the names of the plurality of imaging and editing software displayed in the display section 105. The operating section 106 outputs operation information indicating the received operation to the software starting section 104. The operating section 106 is a user interface, which is a contact sensor layered on a surface of the display section 105, for example.

The software starting section 104 starts the imaging and editing software corresponding to the operation information inputted from the operating section 106. Thus, the software starting section 104 can start up the imaging and editing software selected by the user.

FIG. 7 is a table T2 illustrating an example of software-specific information stored in the storage section 102b according to Modification Example 2. In the table T2 in FIG. 7, a plurality of software identification information is associated with a set of imaging module identification information and optical module identification information. For example, suitable imaging operation software is different between the case of photographing a night view of a town and the case of photographing a starlit sky, using a combination of a high-sensitivity imaging module suitable for photographing at a dark place and a wide-angle lens with a wide field angle. Night view photographing software is suitable for photographing a night view of the town, and constellation search software is suitable for photographing a starlit sky. Thus, in the table T2, for example, as the imaging and editing software corresponding to the combination of the high-sensitivity imaging module and the wide-angle lens, the night view photographing software and the constellation search software are associated with each other.

When a pet is photographed using a combination of a high-accuracy imaging module and a low F-value lens suitable for photographing of a bright image, album software is suitable for only image management, web contribution software is suitable for image sharing on the Internet, and image processing software is suitable for image editing. Here, the low F-value lens is a lens having an F value lower than a predetermined reference. Thus, in the table T2, for example, as the imaging and editing software corresponding to the combination of the high-accuracy imaging module and the low F-value lens, the album software, the web contribution software and the image processing software are associated with each other.

As described above, in Modification Example 2, the software extracting section 103b extracts the plurality of software identification information corresponding to the set of the imaging module identification information and the optical module identification information received by the communicating section 101 from the storage section 102b. As the software extracting section 103b extracts the plurality of imaging and editing software suitable for the combination of the imaging module and the optical module, it is possible to narrow down candidates of the imaging and editing software. Thus, it is possible to reduce the effort of a user to select of the imaging and editing software suitable for a situation.

FIG. 8 is a table T3 illustrating an example of software-specific information when software identification information corresponding to a set of imaging module identification information and optical module identification information is not stored. In the table T3 in FIG. 8, columns of the software identification information are blank.

The software extracting section 103b may start predetermined imaging and editing software (hereinafter, referred to as default software) when the software identification information corresponding to the set of the imaging module identification information and the optical module identification information is not stored in the storage section 102b. In this case, the software extracting section 103b may display a message which means to start the default software in the display section 105 for a user before starting, and may wait for approval of the user. When the operating section 106 receives an approval operation from the user, the software starting section 104 starts the default software. On the other hand, when the operating section 106 receives a non-approval operation from the user, the software extracting section 103b may display a software selection screen in the display section 105, and may wait for selection of the imaging and editing software of the user. When the operating section 106 receives the selection operation of the imaging and editing software from the user, the software starting section 104 may start up the imaging and editing software selected by the user. Thus, the user can select arbitrary imaging and editing software used to start.

The default software may be determined by the user in advance.

Modification Example 3

Figure 9:
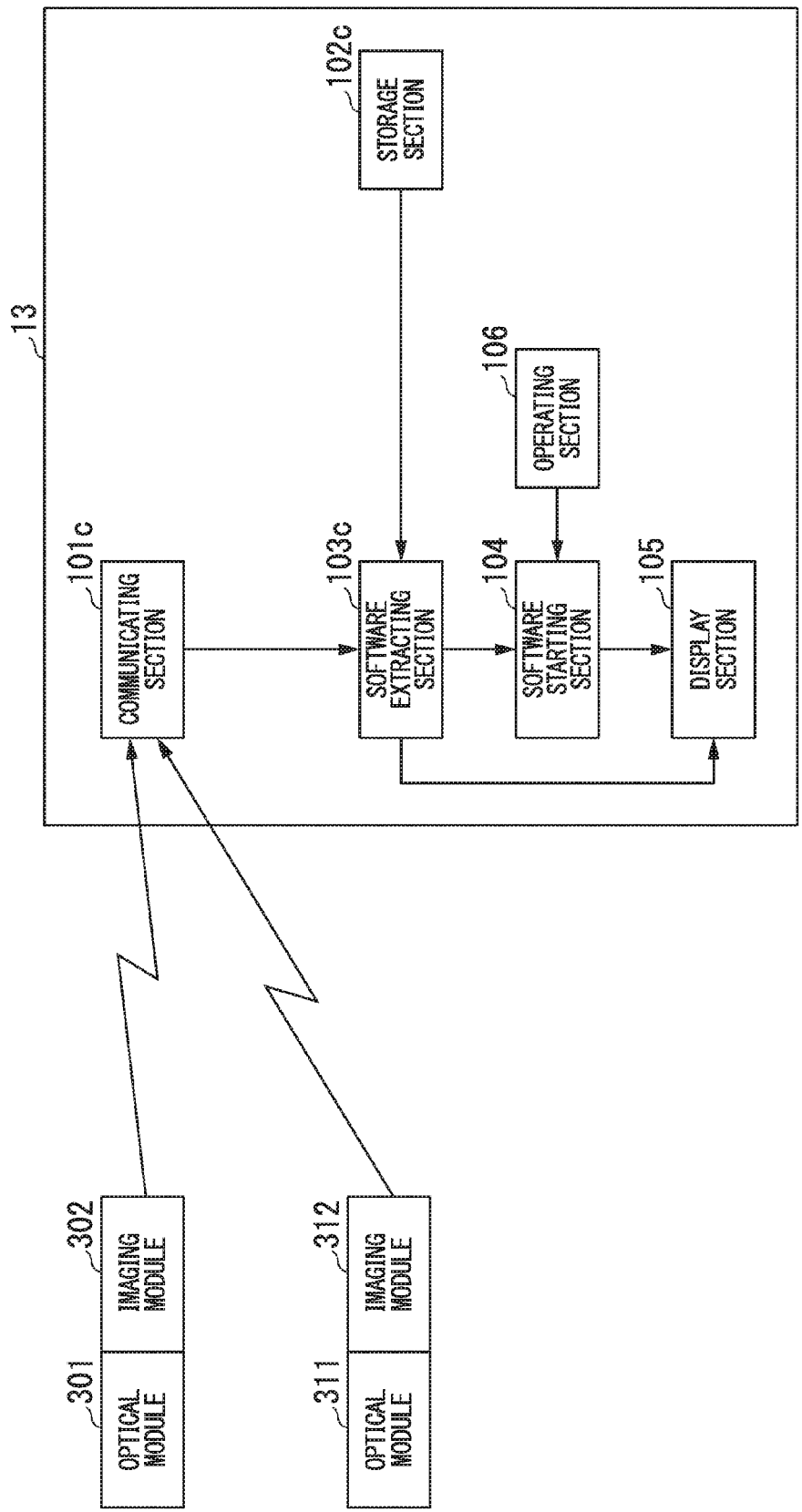
FIG. 9 is a block diagram schematically illustrating a configuration of an imaging operation terminal according to Modification Example 3 of the first embodiment.

Subsequently, Modification Example 3 of the first embodiment will be described. An imaging operation terminal 13 of Modification Example 3 extracts imaging and editing software corresponding to the plurality of sets used to start, if it is possible to communicate with a plurality of sets of the imaging module and the optical module. FIG. 9 is a block diagram schematically illustrating a configuration of the imaging operation terminal 13 according to Modification Example 3 of the first embodiment. The same reference numerals are given to the same components as in FIG. 6, and a detailed description thereof will not be repeated here. The configuration of the imaging operation terminal 13 according to Modification Example 3 is different from the configuration of the imaging operation terminal 12 according to Modification Example 2 in FIG. 6 in that the communicating section 101 is changed to a communicating section 101c, the storage section 102b is changed to a storage section 102c and the software extracting section 103b is changed to a software extracting section 103c.

The communicating section 101c searches an imaging module capable of being connected in a communicatable range, and if the imaging module is found, the communicating section 101c establishes wireless communication with the found imaging module. Further, the communicating section 101c receives from the found imaging module, imaging module identification information used to identify the imaging module and optical module identification information used to identify an optical module which is mounted to the imaging module, wirelessly. In FIG. 9, for example, the imaging module 302 which mounts the optical module 301 and an imaging module 312 which mounts an optical module 311 may be connected in the communicatable range. In this example, the communicating section 101c receives first optical module identification information used to identify the optical module 301 and first imaging module identification information used to identify the imaging module 302 from the imaging module 302, wirelessly. Further, the communicating section 101c receives second optical module identification information used to identify the optical module 311 and second imaging module identification information used to identify the imaging module 312 from the imaging module 312, wirelessly.

On the other hand, when a connectable imaging module is not found even though the search is performed for a predetermined time, the communicating section 101c terminates the search.

In the storage section 102c, software identification information associated with a plurality of sets of the imaging module identification information and the optical module identification information is stored.

The software extracting section 103c extracts software identification information corresponding two sets, that is, the set of the first imaging module identification information and the first optical module identification information and the set of the second imaging module identification information and the second optical module identification information, received by the communicating section 101c.

If one of the plurality of the software identification information is extracted, the software extracting section 103c outputs the software identification information to the software starting section 104. Thus, the software starting section 104 starts imaging and editing software identified by the software identification information. On the other hand, if a plurality of software identification information is extracted, the software extracting section 103c displays names of the imaging and editing software identified by the extracted a plurality of software identification information in the display section 105, for example. Thus, the user can select one imaging and editing software from the displayed names of the plurality of the imaging and editing software.

FIG. 10 is a table T4 illustrating an example of software-specific information stored in the storage section 102c according to Modification Example 3. In the table T4 in FIG. 10, one piece or two software identification information are associated with a set of imaging module identification information and optical module identification information.

For example, in the table T4, with respect the same two sets of a micro four thirds module and a lens, 3D software and panorama software are associated. Here, the micro four thirds module is an imaging module obtained by optimizing a specification of a four thirds system that is a standardization of a digital single lens reflex camera into a mirrorless structure. For example, the imaging operation terminal 13 may obtain depth-directional information by performing known stereo matching by software using the same two combinations of the micro four thirds module and the lens, thereby creating a 3D image. If the panorama software is used with the same combination, it is possible to create an image with a wider field of view.

For example in the table T4, image partial enlargement software is associated with a set of a micro four thirds module and a telephoto lens and a set of a micro four thirds module and a wide-angle lens. Here, by executing the image partial enlargement software, the imaging operation terminal 13 combines images respectively imaged by the telephoto lens and the wide-angle lens, thereby synthesizing the images using software. Thus, the imaging operation terminal 13 can display an image obtained by enlarging a part of an imaging range in the image imaged by the telephoto lens, while grasping an entire imaging range in the image imaged by the wide-angle lens.

Figure 11:
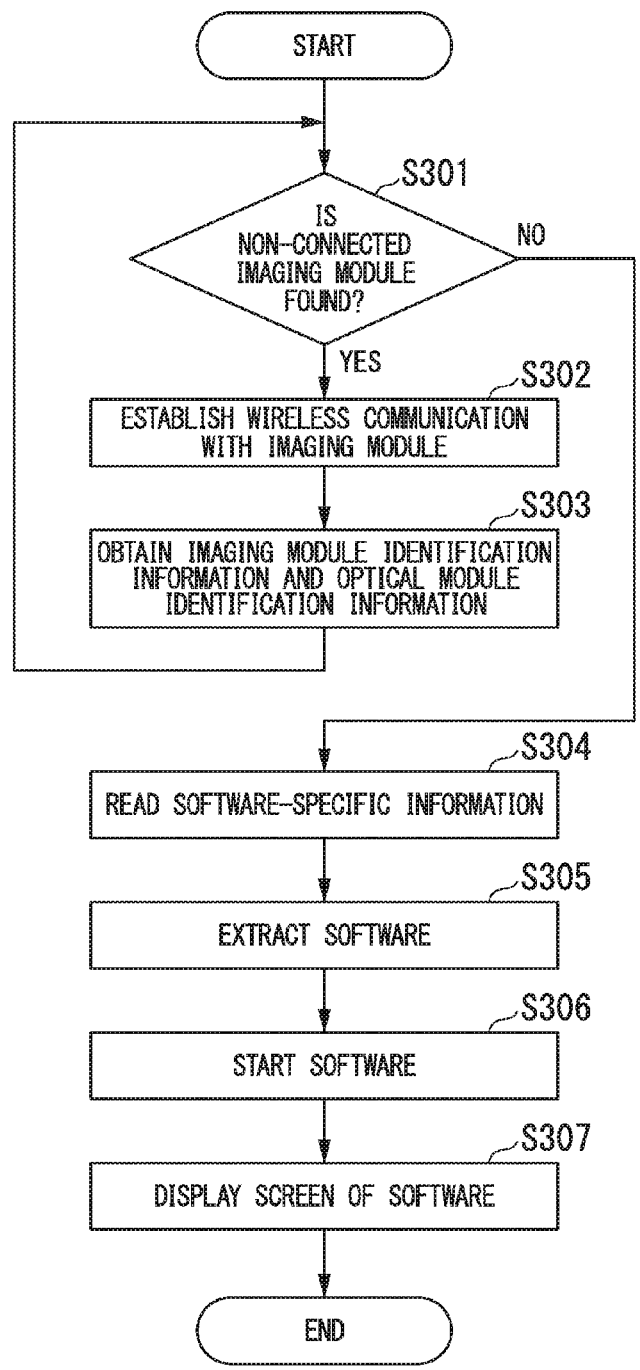
FIG. 11 is a flowchart illustrating an example of the flow of processes of the imaging operation terminal according to Modification Example 3 of the first embodiment.

FIG. 11 is a flowchart illustrating an example of the flow of processes of the imaging operation terminal 13 according to Modification Example 3 of the first embodiment.

First, in step S301, the communicating section 101c searches a non-connected imaging module for a predetermined time. If the non-connected imaging module is found (YES), the communicating section 101c advances the process to step S302. If the non-connected imaging module is not found (NO), the imaging operation terminal 13 advances the process to step S304.

Then, in step S302, the communicating section 101c establishes wireless connection with the found imaging module.

Then, in step S303, the communicating section 101c obtains the imaging module identification information and the optical module identification information from the found imaging module wirelessly, and returns to the process in step S301.

Then, in step S304, the software extracting section 103c reads the software-specific information from the storage section 102c.

Then, in step S305, the software extracting section 103c reads software identification information corresponding to two sets, that is, the set of the first imaging module identification information and the first optical module identification information and the set of the second imaging module identification information and the second optical module identification information, obtained by the communicating section 101c, from the read software-specific information.

Then, in step S306, the software starting section 104 starts imaging and editing software identified by the identification information extracted by the software extracting section 103c.

Then, in step S307, the display section 105 displays a screen of the imaging and editing software started by the software starting section 104. Here, the processes of the present flowchart end.

The software extracting section 103c extracts the software identification information corresponding to two sets, that is, the set of the first imaging module identification information and the first optical module identification information and the set of the second imaging module identification information and the second optical module identification information, received by the communicating section 101c, but the invention is not limited thereto. If the communicating section 101c communicates with three or more imaging modules wirelessly, the communicating section 101c may receive imaging module identification information and optical module identification information from all the imaging modules, and the software extracting section 103c may extract software identification information corresponding to the entire sets of the imaging module identification information and the optical module identification information received by the communicating section 101c.

As described above, in the imaging operation terminal 13 according to Modification Example 3 of the first embodiment, the software extracting section 103c reads the software identification information corresponding to the plurality of sets of the imaging module identification information and the optical module identification information. Further, the software starting section 104 starts the imaging and editing software identified by the software identification information. Thus, for example, the started-up software controls the plurality of module sets, the user can control the plurality of module sets. Thus, in addition to the effects of the first embodiment, the imaging operation terminal 13 can provide various functions to the user.

Modification Example 4

Subsequently, Modification Example 4 of the first embodiment will be described. In an imaging operation terminal 14 of Modification Example 4, a priority level is assigned to each of a plurality of imaging and editing software corresponding to a set of an imaging module and an optical module. The imaging operation terminal 14 extracts software having the highest priority level used to start. FIG.

12 is a block diagram schematically illustrating a configuration of the imaging operation terminal 14 according to Modification Example 4 of the first embodiment. The same reference numerals are given to the same components as in FIG. 4, and a detailed description thereof will not be repeated here. The configuration of the imaging operation terminal 14 according to Modification Example 4 is different from the configuration of the imaging operation terminal 11 according to Modification Example 1 in FIG. 4 in that the storage section 102 is changed to a storage section 102d and the software extracting section 103 is changed to a software extracting section 103d.

In the storage section 102d, a plurality of software identification information is stored in association with each combination of imaging module identification information and optical module identification information. Further, in the storage section 102d, software-specific information in which priority level information indicating priority levels of a plurality of image-related software indicated by the plurality of software identification information that is associated with each software identification information is stored.

The software extracting section 103d reads software-specific information from the storage section 102d, for example. The software extracting section 103d extracts one software-specific information, based on the priority level associated with each of the plurality of software identification information, among the plurality of software identification information corresponding to the combination of the imaging module identification information and the optical module identification information received by the communicating section 101. Specifically, the software extracting section 103d extracts software identification information having the highest priority level from among the plurality of software identification information. The software extracting section 103d outputs the extracted software identification information to the software starting section 104. Thus, the software starting section 104 can start up imaging and editing software having the highest priority level from among the imaging and editing software suitable for the set of the imaging module identification information and the optical module identification information.

FIG. 13 is a table T5 illustrating an example of software-specific information stored in the storage section 102d according to Modification Example 4. In the table T5 in FIG. 13, a plurality of software identification information is associated with a set of imaging module identification information and optical module identification information. Further, a priority level is associated with each of the plurality of software identification information. Here, the "priority level" refers to a priority level of the imaging and editing software identified by the plurality of software identification information. For example, in the case of a set of "imaging module A" and "optical module A", an example is shown in which the priority level of "imaging operation software 1" is the second rank, the priority level of "imaging operation software 2" is the first rank and the priority level of "editing software 3" is the third rank. In this case, the software extracting section 103d reads the "imaging operation software 2" having the priority level of the first rank.

Figure 14:
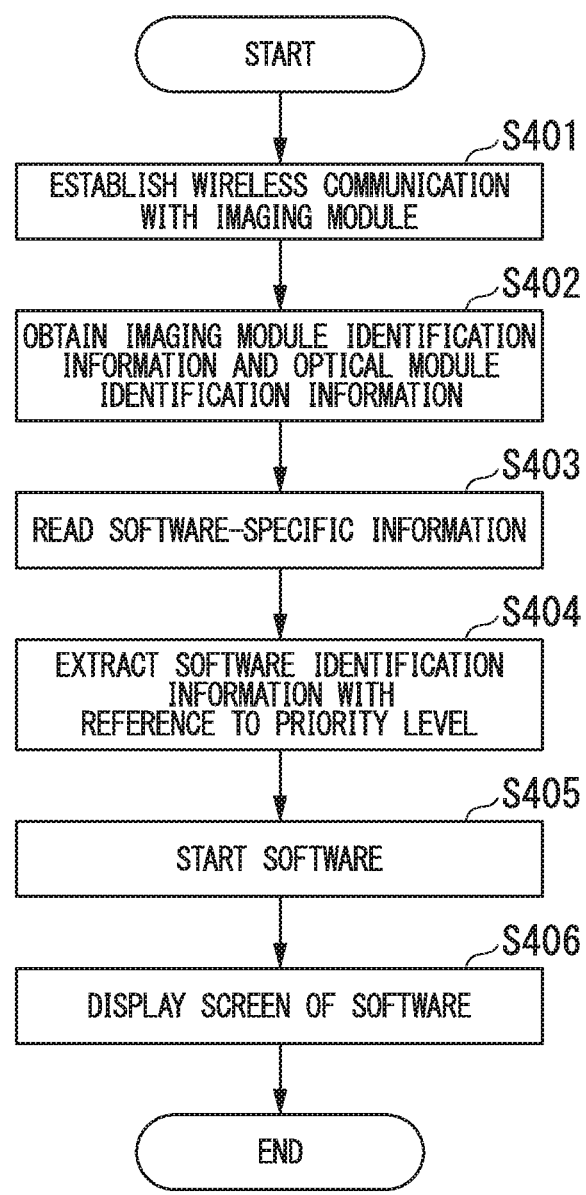
FIG. 14 is a flowchart illustrating an example of the flow of processes of the imaging operation terminal according to Modification Example 4 of the first embodiment.

FIG. 14 is a flowchart illustrating an example of the flow of processes of the imaging operation terminal 14 according to Modification Example 4 of the first embodiment. Since processes of steps S401 to S403 are the same as the processes of steps S201 to S203 in FIG. 5, a description thereof will not be repeated here.

Then, in step S404, the software extracting section 103d extracts the software identification information having the highest priority level among the plurality of software identification information corresponding to the combination of the imaging module identification information and the optical module identification information received by the communicating section 101.

Since the processes of steps S405 and S406 are the same as the processes of steps S205 and S206 in FIG. 5, description thereof will not be repeated. Here, the processes of the present flowchart end.

As described above, in the imaging operation terminal 14 according to Modification Example 4 of the first embodiment, the software extracting section 103d extracts the software identification information having the highest priority level among the plurality of software identification information corresponding to the combination of the imaging module identification information and the optical module identification information received by the communicating section 101. Further, the software starting section 104 starts the software. Thus, even though there are a plurality of candidates of software to be started, the imaging and editing software having the highest priority level is started without the user's selection. Thus, it is possible to reduce the time necessary for the imaging and editing software to become available. Since the user does not have to select one imaging and editing software from the plurality of imaging and editing software, it is possible to remove an effort of the user for selection of the imaging and editing software.

When imaging and editing software having a certain priority level (for example, the highest priority level) is deleted, the software extracting section 103d may sequentially raise the ranks of the imaging and editing software having priority levels lower than that of the deleted imaging and editing software. In this case, for example, even if the imaging and editing software having the highest priority level is deleted, the imaging and editing software having the priority level of the second rank is raised to the first rank. Thus, the software extracting section 103d can constantly extract the imaging and editing software having the highest priority level from the plurality of candidates of imaging and editing software at that time.

Modification Example 5

Figure 12:
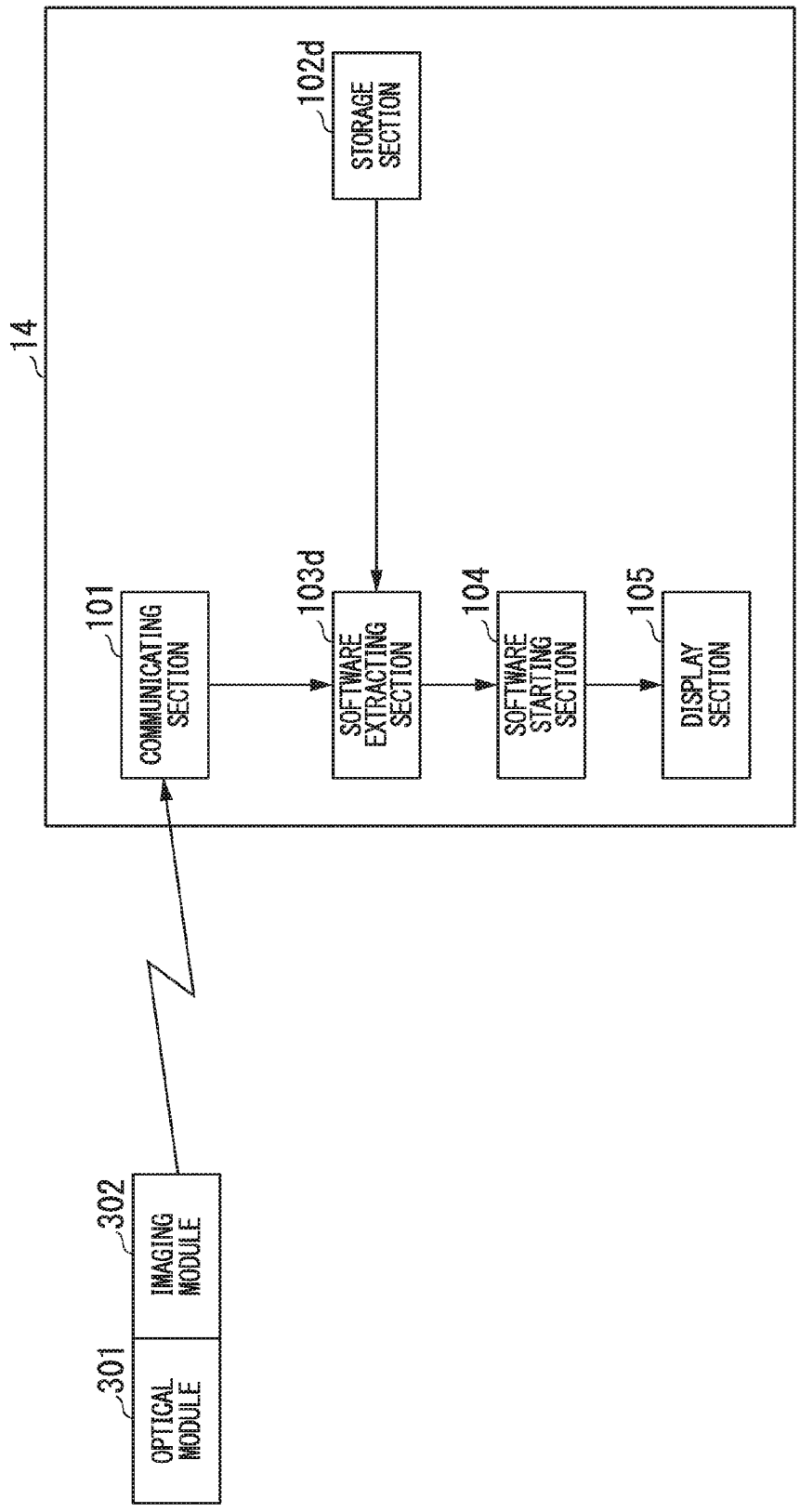
FIG. 12 is a block diagram schematically illustrating a configuration of an imaging operation terminal according to Modification Example 4 of the first embodiment.
Figure 15:
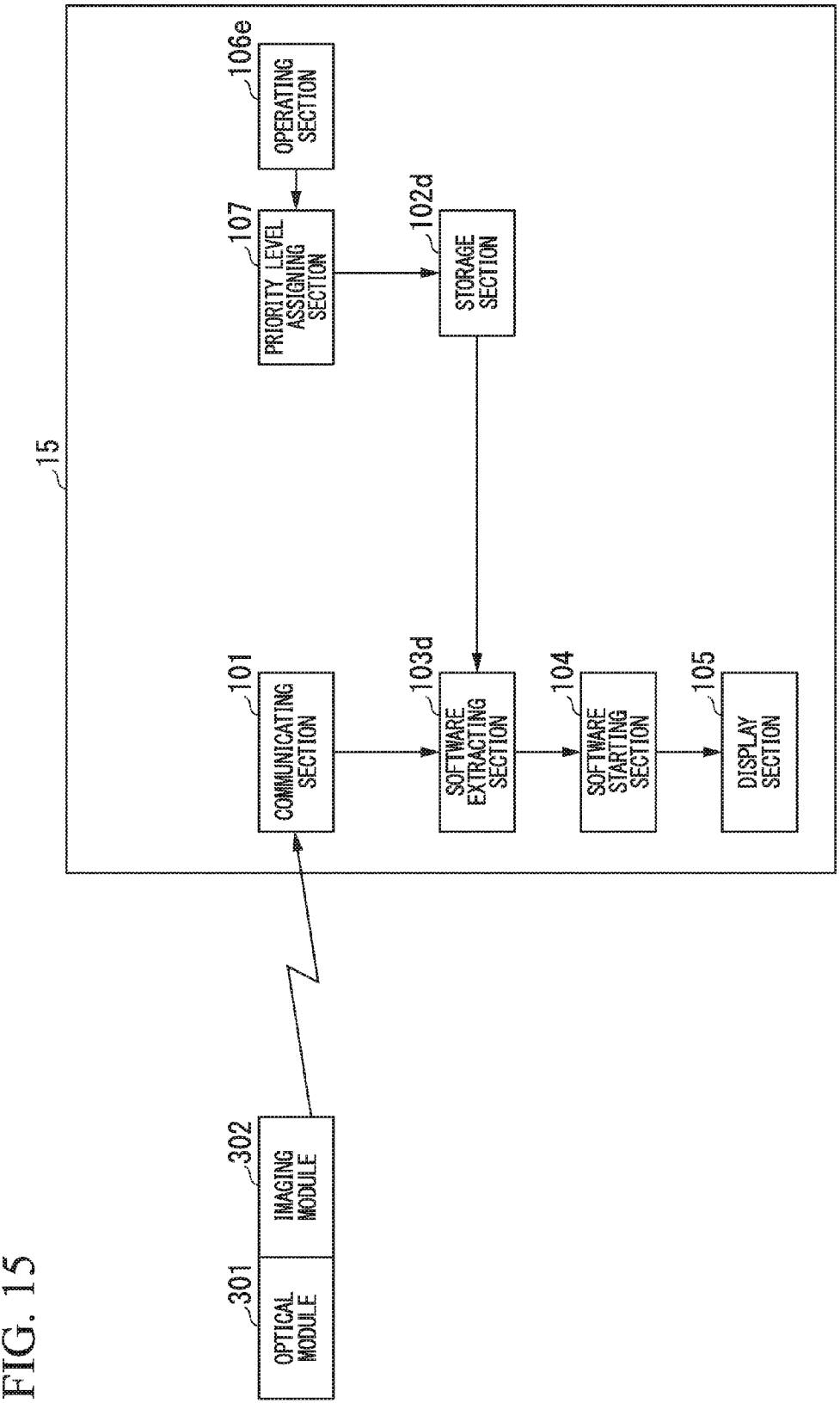
FIG. 15 is a block diagram schematically illustrating a configuration of an imaging operation terminal according to Modification Example 5 of the first embodiment.

Subsequently, Modification Example 5 of the first embodiment will be described. In an imaging operation terminal 15 of Modification Example 5, compared with the imaging operation terminal 14 of Modification Example 4, a process of assigning a priority level to each of a plurality of imaging and editing software corresponding to a set of an imaging module and an optical module based on a predetermined factor is further provided. FIG. 15 is a block diagram schematically illustrating a configuration of the imaging operation terminal 15 according to Modification Example 5 of the first embodiment. The same reference numerals are given to the same components as in FIG. 12 of Modification Example 4, and a detailed description thereof will not be repeated here. The configuration of the imaging operation terminal 15 according to Modification Example 5 is different from the configuration of the imaging operation terminal 14 according to Modification Example 4 in that an operating section 106e and a priority level assigning section 107 are additionally provided.

A user performs, for example, an operation for setting ranks among the plurality of imaging and editing software, to each of the plurality of imaging and editing software corresponding to the set of the imaging module and the optical module. The operating section 106e receives the rank designating operation, and outputs the received operation to the priority level assigning section 107, for example. Thus, the priority level assigning section 107 can determine the weight of each imaging and editing software according to the rank designated by the user.

The priority level assigning section 107 determines the priority levels of the plurality of imaging and editing software indicated by the plurality of software identification information, with respect to the plurality of software identification information associated with each combination of the imaging module identification information and the optical module identification information in the storage section 102*d*, according to a predetermined factor. Further, the priority level assigning section 107 associates the determined priority level with the software identification information to be assigned the priority level, to be additionally stored in the storage section 102*d*. Specifically, for example, the priority level assigning section 107 associates the determined priority level with the software identification information that is a target to be assigned the priority level, included in the software-specific information stored in the storage section 102*d*, for the additional storage. Here, the predetermined factor includes at least one of the number of starts of the imaging and editing software, the rank designation of the user for the imaging and editing software, a use history of the imaging and editing software and an installation date of the imaging and editing software. In the present embodiment, for example, the priority level assigning section 107 determines the priority level, based on the entirety of the number of starts of the imaging and editing software in the past or for a predetermined time (here, for example, the number of selections and starts of the imaging and editing software from the user), the rank designation of the user, the use history of the imaging and editing software, the installation date and other factors. Detailed processes thereof will be described later. Here, the other factors include an operation time of the imaging and editing software, for example, which includes an accumulated operation time of the imaging and editing software for a predetermined time, for example.

The priority level assigning section 107 determines the priority level before reading of the software-specific information is performed by the software extracting section 103*d*, and associates the determined priority level with the software identification information that is the target to be assigned the priority level to be stored in the storage section 102*d*. The priority level assigning section 107 may determine the priority level and may store the determined priority level in the storage section 102*d* at the latest before the time when the software extracting section 103*d* extracts the software identification information. The priority level assigning section 107 may determine the priority level again at the same time with updating of the software-specific information stored in the storage section 102*d* or after the updating, and may again associate the determined priority level with the software identification information included in the software-specific information stored in the storage section 102*d* to be additionally stored therein.

Details of the priority level determination process of the priority level assigning section 107 will be described with reference to FIGS. 16 and 17.

FIG. 16 is a diagram illustrating examples of conversion tables of factor values and scores for each factor. In a table T6 in FIG. 16, the number of starts for a predetermined time and scores thereof are associated with each other. For example, a score of 20 is associated with a case where the number of starts for the predetermined time is 30 or more.

In this example, when the number of starts of "software 2" for the predetermined time is 30 or more, the priority level assigning section 107 assigns number the score of 20 for the number of starts to "software 2". The priority level assigning section 107 additionally writes 20 in the field of "number of starts" of a table T11 in FIG. 17 where the software identification information is "software 2".

The priority level assigning section 107 may determine the score relating to the number of starts for each imaging and editing software with reference to a table T7 in FIG. 16. In the table T7 in FIG. 16, when the number of starts for the predetermined time is arranged in a descending order, ranks and scores are associated with each other. For example, the score of 20 is associated with a case where the number of starts for the predetermined time is the first rank. In this example, when the number of starts of "software 2" for the predetermined time is the first rank, the priority level assigning section 107 assigns the score of 20 for the number of starts to "software 2". The priority level assigning section 107 additionally writes 20 in the field of "number of starts" of the table T11 in FIG. 17 where the software identification information is "software 2".

In a table T8 in FIG. 16, the user designation rank and its score are associated with each other. Here, the user designation rank represents ranks of the plurality of imaging and editing software associated with each combination of imaging module identification information and optical module identification information, which are designated by the user with respect to the plurality of imaging and editing software, respectively. For example, a score of 10 is associated with a case where the user designation rank is the third rank. In this example, when the user designation rank of "software 2" is the third rank, the priority level assigning section 107 assigns the score of 10 for the user designation rank to "software 2". The priority level assigning section 107 additionally writes 10 in the field of "user designation rank" of the table T11 in FIG. 17 where the software identification information is "software 2".

In a table T9 in FIG. 16, the installation date and its score are associated with each other. For example, a score of 10 is associated with a case where the installation date of the imaging and editing software is within the last six to fifteen days. In this example, when the installation date of "software 2" is within the last six to fifteen days, the priority level assigning section 107 assigns the score of 10 for the installation date to "software 2". The priority level assigning section 107 additionally writes 10 in the field of "installation date" of the table T11 in FIG. 17 where the software identification information is "software 2".

In a table T10 in FIG. 16, the use history and its score are associated with each other. For example, a score of 10 is associated with a case where the imaging and editing software is software used in the immediate past. In this example, when the "software 2" is the software used in the immediate past, the priority level assigning section 107 assigns the score of 10 for the use history to "software 2". The priority level assigning section 107 additionally writes 10 in the field of "use history" of the table T11 in FIG. 17 where the software identification information is "software 2".

FIG. 17 is an example of the table 11 generated for determining the priority level of the imaging and editing software by the priority level assigning section 107. The table T11 is generated by the priority level assigning section 107 for each combination of the imaging module identification information and the optical module identification information. In the table T11, sets of the software identification information, the number of starts, the user designation rank, the installation date, the use history, the other factors, the total score and the priority level are shown. Here, the software identification information in the table T11 represents software identification information stored in the storage section 102d corresponding to a set of certain imaging module identification information and certain optical module identification information. The number of starts represents scores determined by the priority level assigning section 107 according to the number of starts. The user designation rank represents scores determined by the priority level assigning section 107 according to the user designation rank. The installation date represents scores determined by the priority level assigning section 107 according to the installation date. The use history represents scores determined by the priority level assigning section 107 according to the use history. The other factors represent scores determined by the priority level assigning section 107 according to the other items. The total score represents scores obtained by adding up the scores that are respectively assigned according to the number of starts, the user designation rank, the installation date, the use history and the other items for each software identification information by the priority level assigning section 107. The priority levels represent ranks assigned by the priority level assigning section 107 in a descending order of the total scores.

Next, an example of the process of the priority level assigning section 107 will be described with reference to FIGS. 16 and 17. The priority level assigning section 107 reads the plurality of software identification information stored in the storage section 102d corresponding to the set of the certain imaging module identification information and the certain optical module identification information. The priority level assigning section 107 stores the read software identification information in the table T11 in FIG. 17.

The priority level assigning section 107 counts the number of starts for the predetermined time, and retains the counted number of starts. For example, the priority level assigning section 107 determines the score according to the number of starts for the predetermined time with reference to the table T6 in FIG. 16 for each the read software identification information, and additionally writes the determined score in the table T11 in FIG. 17.

The priority level assigning section 107 retains the user designation rank received by the operating section 106e. Here, the user designation rank represents ranks designated by the user for each imaging and editing software. For example, the priority level assigning section 107 determines the score according to the user designation rank, with reference to the table T8 in FIG. 16 for each the read software identification information, and additionally writes the determined score in the table T11 in FIG. 17.

For example, the priority level assigning section 107 retains the installation date for each imaging and editing software in advance. Further, for example, the priority level assigning section 107 determines an installation date indicating how many days in advance installation is performed from the installation date for each imaging and editing software or from the current date. For example, the priority level assigning section 107 determines the score according to the installation date with reference to the table T9 in FIG. 16 for each the read software identification information, and additionally writes the determined score in the table T11 in FIG. 17.

For example, the priority level assigning section 107 retains in advance the use history indicating whether the imaging and editing software is software started at the immediately previous time, one time before the previous time, or two times before the previous time, for each imaging and editing software. For example, the priority level assigning section 107 determines the score according to the use history with reference to the table T10 in FIG. 16 for each the read software identification information, and additionally writes the determined score in the table T11 in FIG. 17. For example, the priority level assigning section 107 determines the score according to the other items for each the read software identification information, and additionally writes the determined score in the table T11 in FIG. 17.

The priority level assigning section 107 adds up the scores assigned to the number of starts, the user designation rank, the installation date, the use history and the other items, respectively, with reference to the table T11 in FIG. 17, for each software identification information in the table T11 in FIG. 17. Further, the priority level assigning section 107 additionally writes the obtained total score in the table T11 in FIG. 17. The priority level assigning section 107 assigns a high priority level in order from a set having a large total score, and additionally writes the assigned priority level in the table T11 in FIG. 17. Thus, the table T11 for the set of the certain imaging module identification information and the certain optical module identification information is completed. The priority level assigning section 107 generates the table T11 for each set of the imaging module identification information and the optical module identification information.

The priority level assigning section 107 assigns priority levels so as not to overlap in the plurality of imaging and editing software corresponding to the set of the certain imaging module identification information and the certain optical module identification information. For example, if the scores are overlapped, the priority level assigning section 107 assigns the priority levels in the installation order, in the Japanese alphabetical order or the like of the imaging and editing software. Thus, since the number of the imaging and editing software of which the priority level is the first rank is always one, the software extracting section 103d can always extract one imaging and editing software.

The priority level assigning section 107 associates the priority level with each of the plurality of software identification information corresponding to the set of the imaging module identification information and the optical module identification information stored in the storage section 102d with reference to the table generated for each set of the imaging module identification information and the optical module identification information, to be additionally stored in the storage section 102d.

Figure 18:
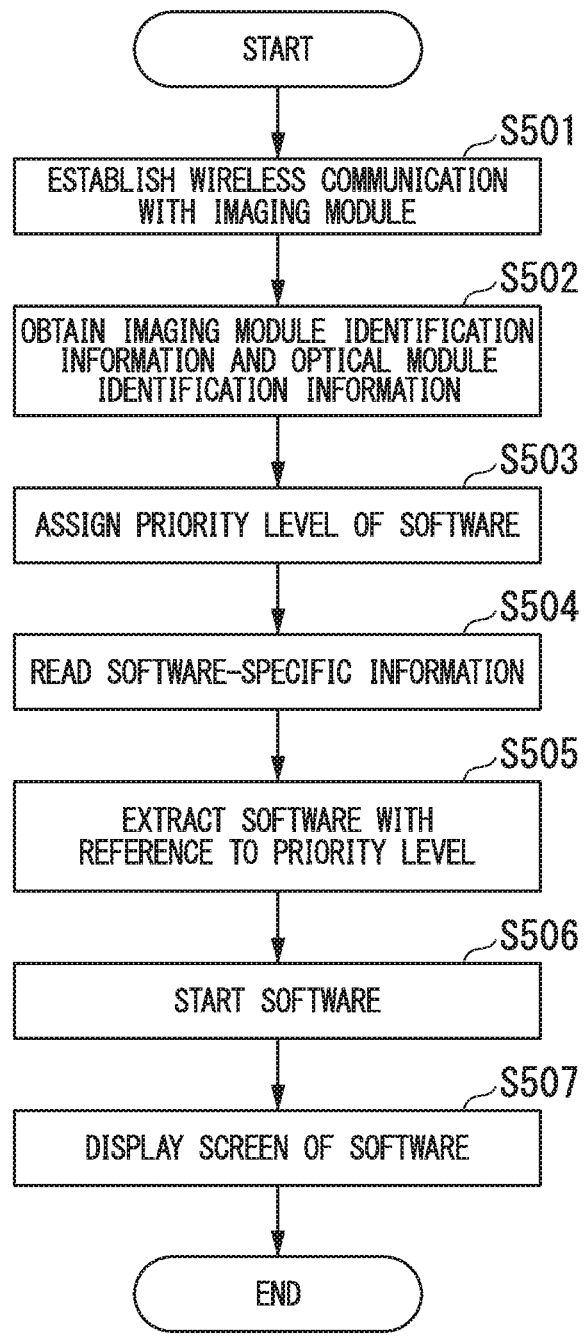
FIG. 18 is a flowchart illustrating an example of the flow of processes of the imaging operation terminal according to Modification Example 5 of the first embodiment.

FIG. 18 is a flowchart illustrating an example of the flow of processes of the imaging operation terminal according to Modification Example 5 of the first embodiment. Since processes of steps S501 and 502 are the same as the processes of steps S201 and S202 in FIG. 5, a description thereof will not be repeated here.

Then, in step S503, the priority level assigning section 107 associates the priority level with each of the plurality of software identification information corresponding to the set of the imaging module identification information and the optical module identification information stored in the storage section 102d, to be additionally stored in the storage section 102d.

Since processes of steps S504 to S507 are the same as the processes of steps S403 and S406 in FIG. 14, a description thereof will not be repeated here. Here, the processes of the present flowchart end.

As described above, in Modification Example 5, since the priority level assigning section 107 determines the priority level of the imaging and editing software to be started based on the number of starts, the user designation rank, the installation date of the imaging and editing software and the use history of the imaging and editing software and starts the imaging and editing software having the highest priority level, it is possible to start imaging and editing software desired by the user. Thus, it is possible to reduce the number of reselections of the imaging and editing software of the user, and thus, it is possible to reduce an effort of the user for the selection of the imaging and editing software.

The user may designate the values of the scores stored in the tables T6 to T10 for each factor. For example, in the table T6, by operation of the operating section 106*e* of the user, the score when the number of starts is 30 or more may be designated as 15, and the priority level assigning section 107 of the imaging operation terminal 15 may update the table by the designated score. Thus, it is possible to set a priority level close to a user's preference.

The user may designate which factor is important or which factor is unnecessary. In this case, the operating section 106*e* receives the designation of the user, and outputs the received designation to the priority level assigning section 107. The priority level assigning section 107 may multiply the score assigned to each factor by a weight according to the received designation, and may add up values obtained by multiplying the scores by the weights to calculate a total score. Here, for example, if a certain factor is designated as unnecessary, its weight may be set to 0, and if a certain factor is designated as important, its weight may be set to 2. Thus, it is possible to achieve an effect of strongly reflecting a user's preference on the imaging and editing software to be started.

The priority level assigning section 107 determines the scores with reference to the tables T6 to T10, but the invention is not limited thereto. For example, the priority level assigning section 107 may determine the scores so that as the number of starts in the past or for a predetermined time is increased, the score is increased. Thus, the imaging operation terminal 15 can preferentially start imaging and editing software having a large number of starts by the user, thereby improving the probability to start up the imaging and editing software preferred by the user.

For example, the priority level assigning section 107 may determine the scores so that as the imaging and editing software is recently used, the score is increased. Thus, the imaging operation terminal 15 can preferentially start the imaging and editing software that is recently used, thereby improving the probability to start up the imaging and editing software preferred by the user.

For example, the priority level assigning section 107 may determine the scores so that as the installation date is nearest, the score is increased. Thus, the imaging operation terminal 15 can preferentially start the imaging and editing software of which the installation date is nearest, thereby improving the probability of starting up the imaging and editing software preferred by the user.

For example, the priority level assigning section 107 may determine the scores so that as the accumulated operation time of the imaging and editing software for the predetermined time is long, the score is increased. Thus, the imaging operation terminal 15 can preferentially start up the imaging and editing software of which the accumulated operation time is long, thereby improving the probability of starting up the imaging and editing software preferred by the user.

For example, the priority level assigning section 107 may retain an operation time in the recent starting for each imaging and editing software, and may determine the scores so that as the operation time in the recent starting increases, the score is increased. Thus, the imaging operation terminal 15 can preferentially start up the imaging and editing software of which the operation time in the recent starting is long, thereby improving the probability to start up imaging and editing software preferred by the user.

If the starting time is shorter than a predetermined time, the priority level assigning section 107 may not count the starting as the number of starts.

The software starting section 104 starts the imaging and editing software extracted by the software extracting section 103*d*, but if the user finishes the imaging and editing software within a predetermined time from the starting, the priority level assigning section 107 may subtract 1 from the counted value of the number of starts.

Modification Example 6

Subsequently, Modification Example 6 of the first embodiment will be described. An imaging operation terminal 16 of Modification Example 6 list-displays names of a plurality of imaging and editing software corresponding to imaging module identification information and optical module identification information, according to the priority level associated with each of the software identification information. Further, the imaging operation terminal 16 of Modification Example 6 starts the imaging and editing software selected by a user from the names of the list-displayed imaging and editing software.

Figure 19:
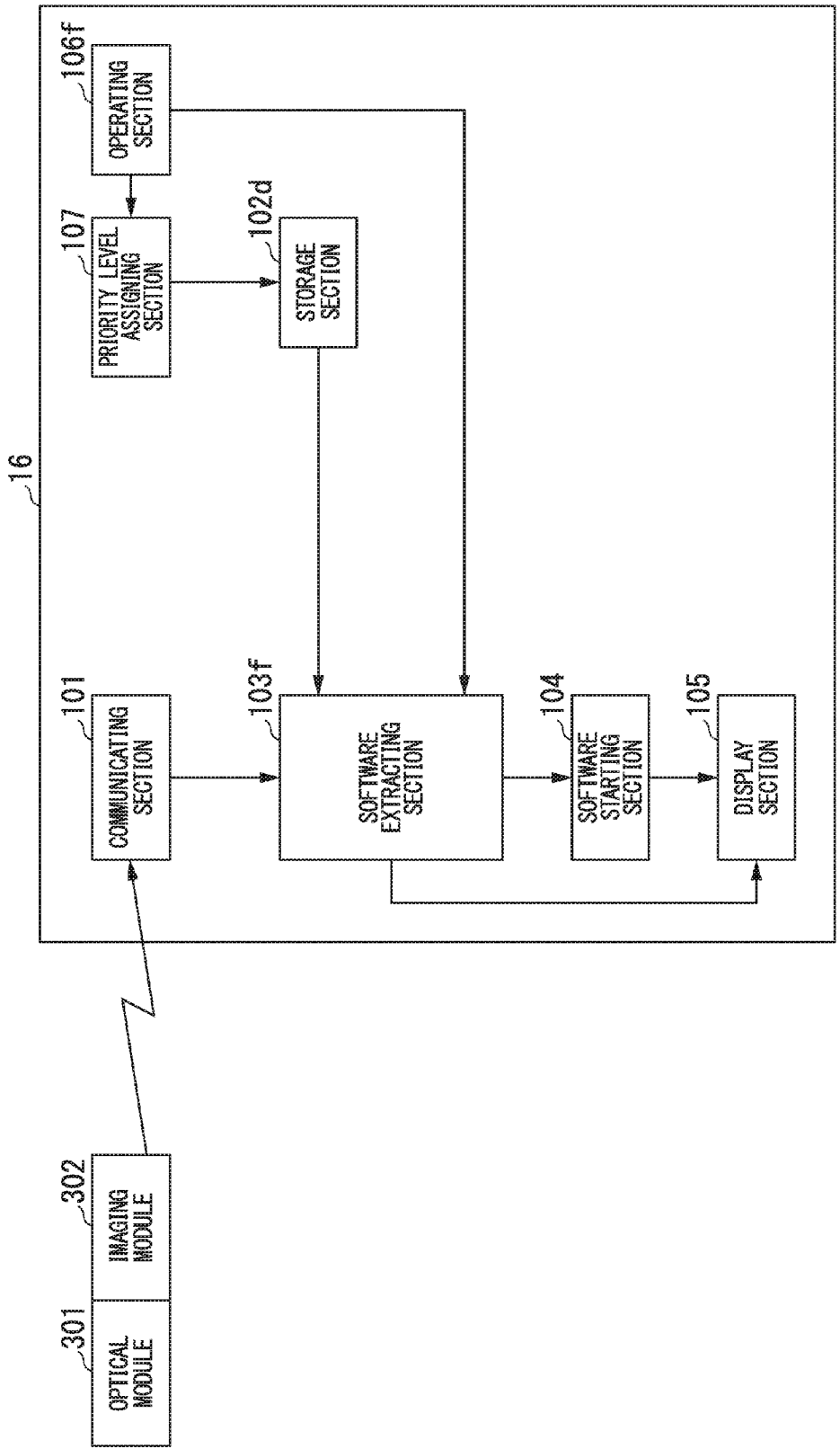
FIG. 19 is a block diagram schematically illustrating a configuration of an imaging operation terminal according to Modification Example 6 of the first embodiment.

FIG. 19 is a block diagram schematically illustrating a configuration of the imaging operation terminal 16 according to Modification Example 6 of the first embodiment. The same reference numerals are given to the same components as in FIG. 15, and a detailed description thereof will not be repeated here. The configuration of the imaging operation terminal 16 according to Modification Example 6 is different from the configuration of the imaging operation terminal 15 according to Modification Example 5 in FIG. 15 in that the software extracting section 103*d* is changed to a software extracting section 103*f* and the operating section 106*e* is changed to an operating section 106*f*.

The software extracting section 103*f* has the same function as that of the software extracting section 103*d* according to Modification Example 5, except for the following points. The software extracting section 103*f* reads a plurality of software identification information corresponding to the imaging module identification information and the optical module identification information received by the communicating section 101 and their priority levels associated with the software identification information. For example, the software extracting section 103*f* list-displays the names of the imaging and editing software identified by the read software identification information according to the priority levels. Specifically, for example, the software extracting section 103*f* arranges as the priority level of the read software identification information is high, the name of the imaging and editing software in an upper part of a pull-down menu, and list-displays the names of the imaging and editing software in the display section 105 as a pull-down menu. The user can select the name of one imaging and editing software from the list-displayed names of the imaging and editing software.

The operating section 106*f* has the same function as that of the operating section 106*e*, however, the operating section 106*f* has the following additional function. When the user performs an operation of selecting the name of one imaging and editing software from the list-displayed names of the imaging and editing software, the operating section 106*f* receives the operation of the user, and outputs information on the received operation to the software extracting section 103*f*.

The software extracting section 103*f* selects the imaging and editing software selected by the user based on the operation information inputted from the operating section 106*f*, and outputs software identification information used to identify the selected imaging and editing software to the software starting section 104. Thus, the software starting section 104 can start up the imaging and editing software selected by the user.

For example, the software extracting section 103*f* may list-display the names of the imaging and editing software in the display section 105 so that as the priority level of the read software identification information is high, the name of the imaging and editing software is arranged upward.

Figure 20:
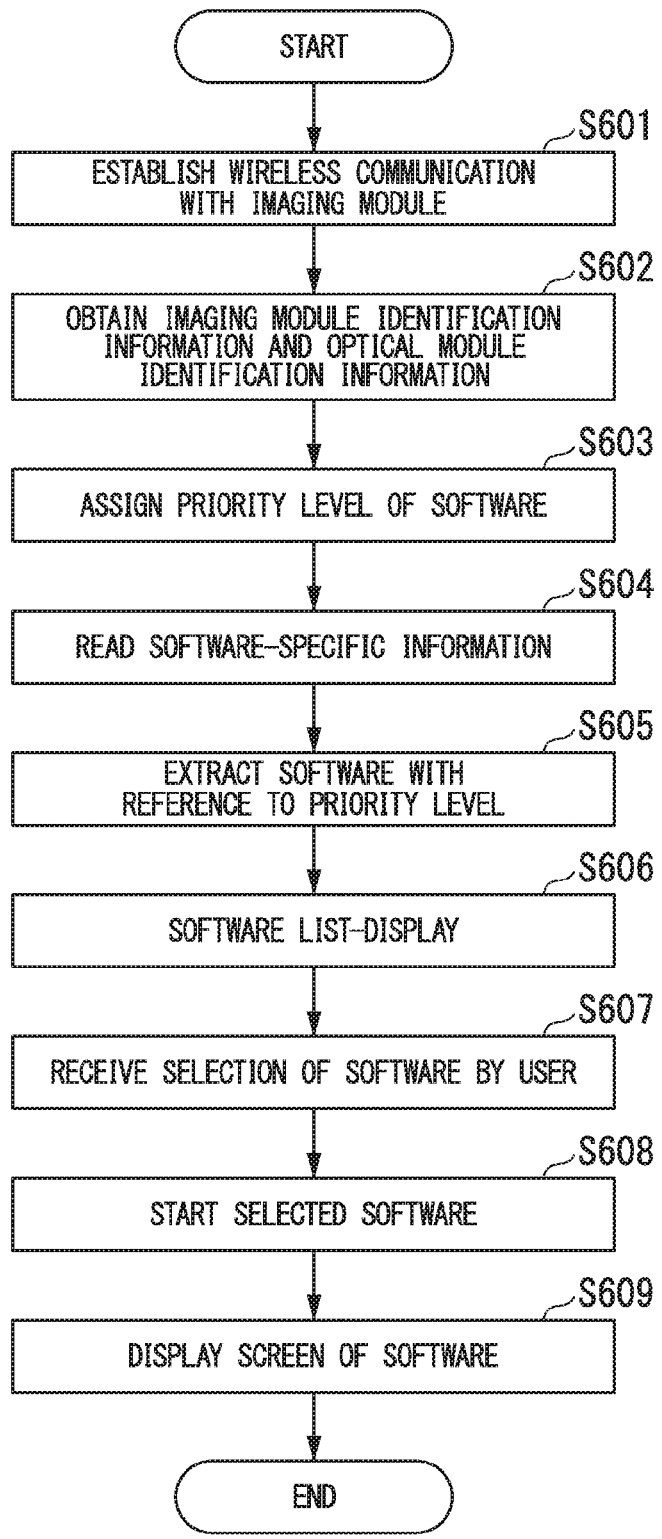
FIG. 20 is a flowchart illustrating an example of the flow of processes of the imaging operation terminal according to Modification Example 6 of the first embodiment.

FIG. 20 is a flowchart illustrating an example of the flow of processes of the imaging operation terminal according to Modification Example 6 of the first embodiment. Since processes of steps S601 to S604 are the same as the processes of steps S501 to S504 in FIG. 18, a description thereof will not be repeated here.

Next, in step S605, the software extracting section 103*f* reads a plurality of software identification information corresponding to the imaging module identification information and the optical module identification information received by the communicating section 101 and their priority levels associated with the software identification information.

Then, in step S606, the software extracting section 103*f* arranges the name of the imaging and editing software in the upper part of the pull-down menu as the priority level of the read software identification information is high, and list-displays the names of the imaging and editing software in the display section 105 in a pull-down menu.

Then, in step S607, the operating section 106*f* receives the selection of the imaging and editing software of the user.

Then, in step S608, the software extracting section 103*f* selects the imaging and editing software selected by the user, and the software starting section 104 starts the imaging and editing software selected by the user.

Then, in step S609, the software starting section 104 displays a screen of the imaging and editing software which starts up. Here, the processes of the present flowchart end.

As described above, in Modification Example 6, the software extracting section 103*f* arranges the name of the imaging and editing software in the upper part of the pull-down menu as the priority level of the read software identification information is high, and list-displays the names of the imaging and editing software in the display section 105 in a pull-down manner. Since as the priority level of the imaging and editing software is high, the name is arranged and displayed in the upper part of the display screen of the list, it is possible to display imaging and editing software with a high possibility that user desires the start in the upper part of the display screen. Further, it is possible to simplify the selection operation of the imaging and editing software of the user, thereby reducing the burden of the user. Furthermore, as the software extracting section 103*f* displays the names of the imaging and editing software in a pull-down menu, it is possible to reduce the burden of the user interface operation in selecting the imaging and editing software. As the user selects the imaging and editing software to be started from the imaging and editing software list-displayed in the display section 105, it is possible to suppress the start of imaging and editing software unintended by the user. As described above, in the imaging operation terminal 16 of Modification Example 6, it is possible to suppress the start of the imaging and editing software unintended by the user, while reducing the burden of the user, in addition to the effects of Modification Example 5.

Modification Example 7

Subsequently, Modification Example 7 of the first embodiment will be described. An imaging operation terminal 17 of Modification Example 7 updates software-specific information which is retained in advance, when the imaging operation terminal 17 receives imaging module identification information and optical module identification information.

Figure 21:
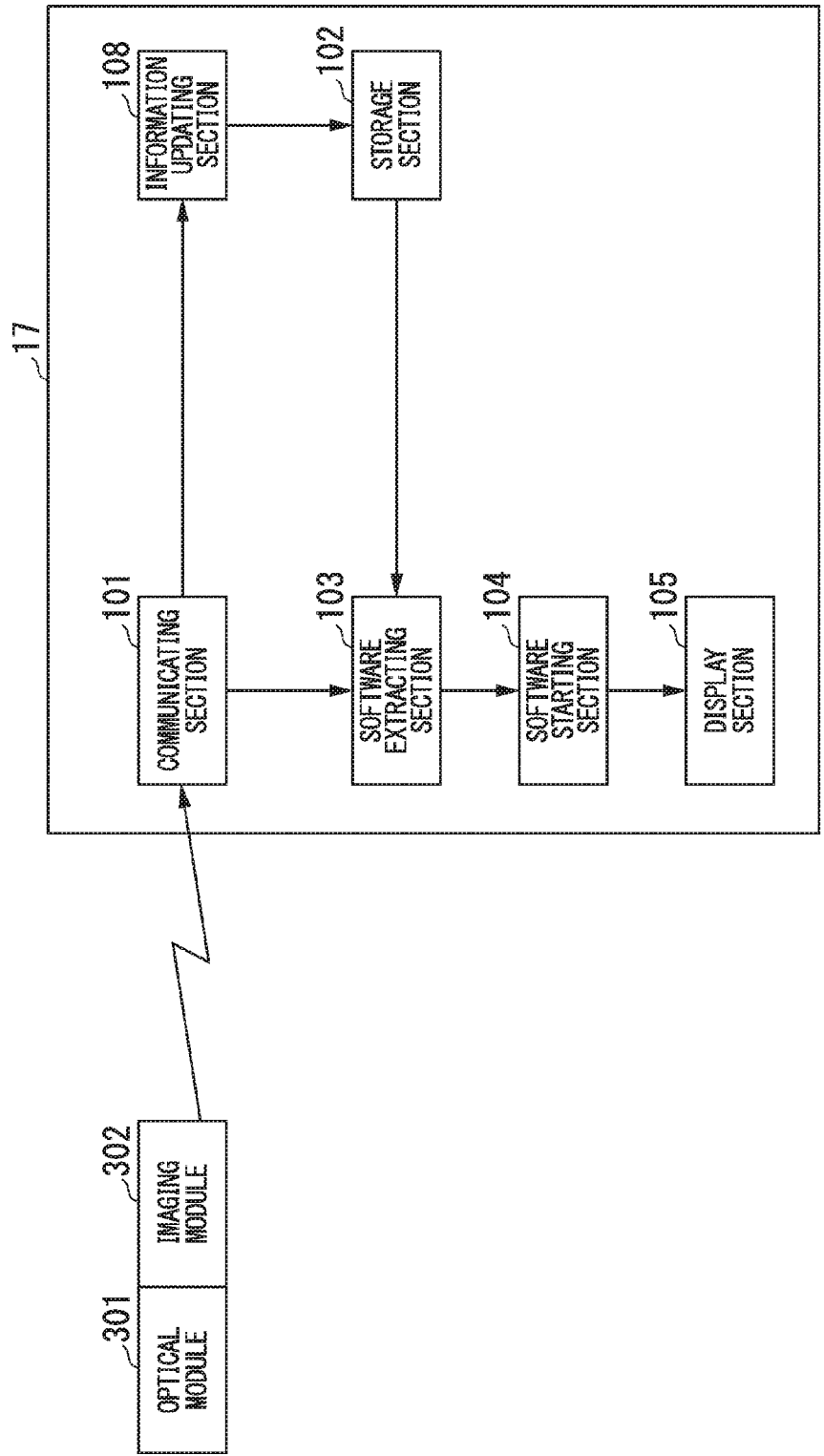
FIG. 21 is a block diagram schematically illustrating a configuration of an imaging operation terminal according to Modification Example 7 of the first embodiment.

FIG. 21 is a block diagram schematically illustrating a configuration of the imaging operation terminal 17 according to Modification Example 7 of the first embodiment. The same reference numerals are given to the same components as in FIG. 4, and a detailed description thereof will not be repeated here. The configuration of the imaging operation terminal 17 according to Modification Example 7 is different from the configuration of the imaging operation terminal 11 according to Modification Example 1 in FIG. 4 in that an information updating section 108 is added.

The information updating section 108 obtains the imaging module identification information and the optical module identification information received by the communicating section 101. Further, the information updating section 108 updates software-specific information stored in the storage section 102. Here, the software-specific information is information in which software identification information is associated with the set of the imaging module identification information and the optical module identification information. Specifically, the information updating section 108 updates at least one the software identification information, the imaging module identification information and the optical module identification information, in the software-specific information stored in the storage section 102. For example, if the set of the imaging module identification information and the optical module identification information received by the communicating section 101 is not stored in the software-specific information in the storage section 102, the information updating section 108 additionally stores the set of the imaging module identification information and the optical module identification information in the software-specific information. Thus, it is possible to update the software-specific information stored in the storage section 102 into the latest state. For example, the information updating section 108 may perform the updating from the time when the communicating section 101 obtains the imaging module identification information and the optical module identification information to the time when the software extracting section 103 reads the software-specific information.

The software extracting section 103 may directly read the software identification information corresponding to the set of the imaging module identification information and the optical module identification information received by the communicating section 101 from the storage section 102. In this case, for example, the information updating section 108 may perform the updating from the time when the communicating section 101 obtains the imaging module identification information and the optical module identification information to the time when the software extracting section 103 reads the software identification information from the storage section 102.

Figure 22:
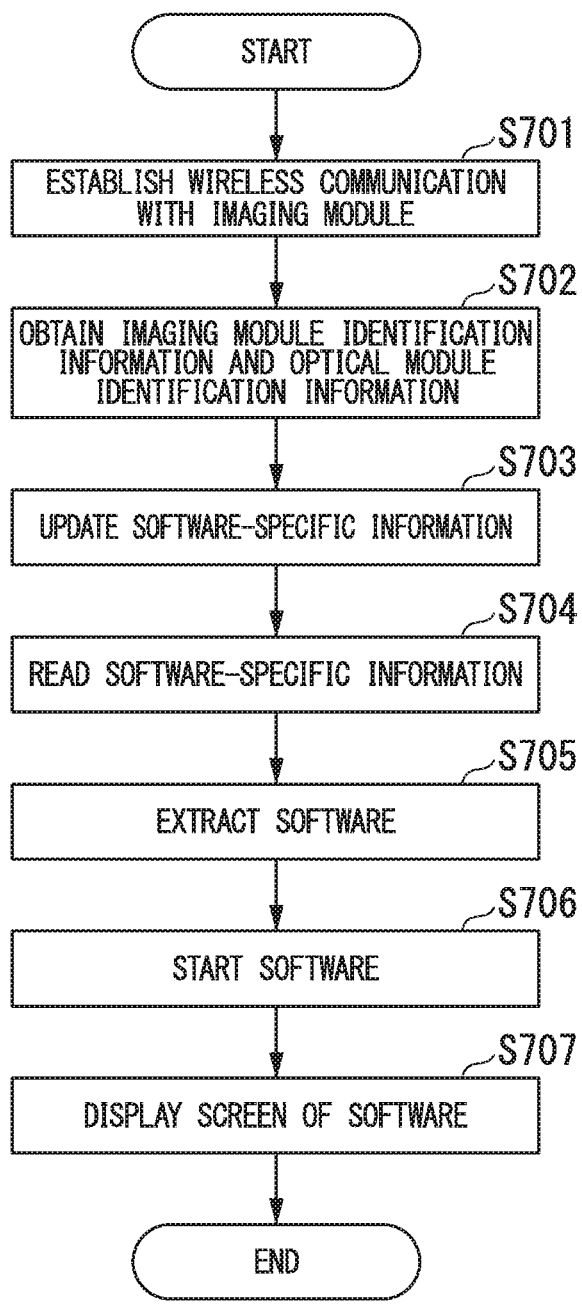
FIG. 22 is a flowchart illustrating an example of the flow of processes of the imaging operation terminal according to Modification Example 7 of the first embodiment.

FIG. 22 is a flowchart illustrating an example of the flow of processes of the imaging operation terminal 17 according to Modification Example 7 of the first embodiment. Since processes of steps S701 and S702 are the same as the processes of steps S201 and S202, a description thereof will not be repeated here.

Next, in step S703, the information updating section 108 updates the software-specific information stored in the storage section 102.

Since processes of steps S704 to S707 are the same as the processes of steps S203 to S206 in FIG. 5, a description thereof will not be repeated here. Here, the processes of the present flowchart end.

As described above, in Modification Example 7, since the software-specific information is updated before the software-specific information is read, when the imaging and editing software is used, it is possible to constantly use the latest software-specific information, in addition to the effects of Modification Example 1.

Modification Example 8

Subsequently, Modification Example 8 of the first embodiment will be described. An imaging operation terminal 18 of Modification Example 8 detects whether imaging and editing software is added or deleted. If the imaging and editing software is added or deleted, the imaging operation terminal 18 updates the retaining software-specific information, when the imaging operation terminal 18 receives imaging module identification information and optical module identification information.

Figure 23:
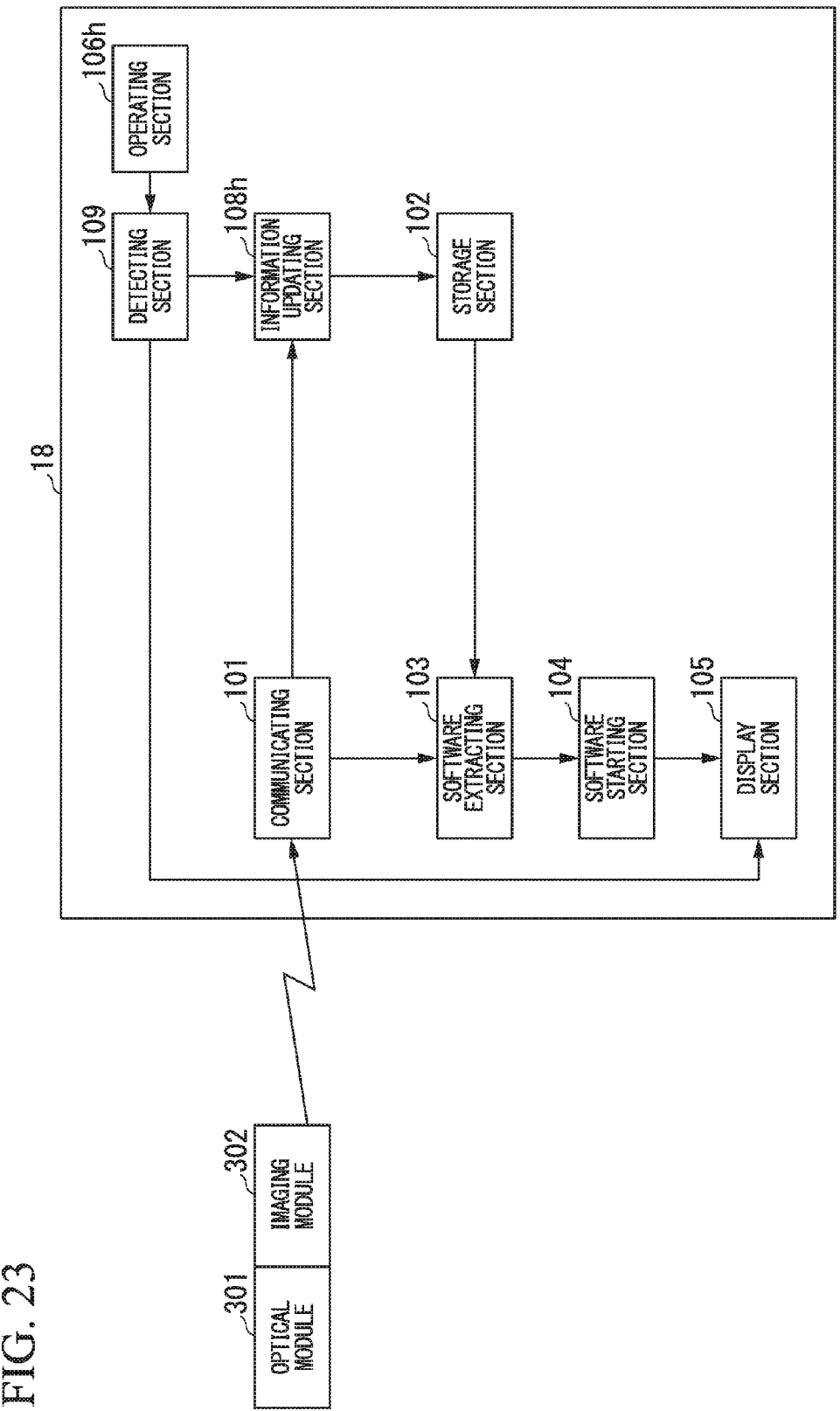
FIG. 23 is a block diagram schematically illustrating a configuration of an imaging operation terminal according to Modification Example 8 of the first embodiment.

FIG. 23 is a block diagram schematically illustrating a configuration of the imaging operation terminal 18 according to Modification Example 8 of the first embodiment. The same reference numerals are given to the same components as in FIG. 21, and a detailed description thereof will not be repeated here. The configuration of the imaging operation terminal 18 according to Modification Example 8 is different from the configuration of the imaging operation terminal 17 according to Modification Example 7 in FIG. 21 in that the information updating section 108 is changed to an information updating section 108*h* and an operating section 106*h* and a detecting section 109 are added.

The detecting section 109 detects that imaging and editing software is newly installed in the host apparatus and that imaging and editing software installed in the host apparatus is deleted. Specifically, for example, the detecting section 109 retains a list of the imaging and editing software installed in the host apparatus in advance. For example, the detecting section 109 searches the imaging and editing software installed in the host apparatus. For example, the detecting section 109 compares the list of the imaging and editing software obtained as the search result with the list of the imaging and editing software that is retained in advance. If the software is added or deleted with respect to the list of the imaging and editing software retained in advance, the detecting section 109 inquires of a user whether the added or deleted software is really the imaging and editing software. Specifically, for example, the detecting section 109 displays a screen for inquiring of the user whether the added or deleted imaging and editing software is the imaging and editing software in the display section 105. Thus, the user can give an answer whether the added or deleted software is the imaging and editing software.

The operating section 106*h* receives an operation indicating the user's answer to the question, and outputs operation information indicating the operation to the detecting section 109.

The detecting section 109 obtains the user's answer based on the operation information, and if the user's answer indicates that the added or deleted software is the imaging and editing software, the detecting section 109 notifies the information updating section 108*h* of an item changed by the addition or deletion (hereinafter, referred to as a changed item). On the other hand, if the user's answer indicates that the added or deleted software is not the imaging and editing software, the detecting section 109 does not notify the information updating section 108*h*.

Further, the detecting section 109 updates the list of the imaging and editing software in advance using the list of the imaging and editing software obtained as the search result. According to the updating, the detecting section 109 can compare the list of the imaging and editing software obtained in the previous search and the list of the imaging and editing software obtained in the current search.

The information updating section 108*h* has the same function as that of the information updating section 108 according to Modification Example 7, except for the following points. When the detecting section 109 detects the addition of the imaging and editing software, the information updating section 108*h* performs the updating while associating software identification information used to identify the added imaging and editing software with the set of the imaging module identification information and the optical module identification information received by the communicating section 101, in the software-specific information stored in the storage section 102, using the changed item inputted from the detecting section 109, for example. Here, the software-specific information is information in which the software identification information is associated with the set of the imaging module identification information and the optical module identification information. Thus, when the imaging and editing software is added, the information updating section 108*h* can associate the added imaging and editing software with the set of the imaging module 302 that is currently connected in a wireless connection and the optical module 301 which is mounted to the imaging module 302.

On the other hand, when the detecting section 109 detects the deletion of the imaging and editing software, the information updating section 108*h* deletes software identification information used to identify the imaging and editing software deleted from the host apparatus, from all the sets of the imaging module identification information and the optical module identification information in the software-specific information stored in the storage section 102, using the changed item inputted from the detecting section 109, for example. Thus, when the imaging and editing software is deleted, the information updating section 108*h* can delete the software identification information of the imaging and editing software deleted from the host apparatus, with respect to all the sets of the imaging module 302 and the optical module 301 in the software-specific information.

When the detecting section 109 does not detect the addition or deletion of the imaging and editing software, the information updating section 108*h* does not update the software-specific information.

FIG. 24 shows examples of the software-specific information after change and before change. An example in which the addition of the imaging and editing software is present is shown on the left side of the figure, and an example in which the deletion of the imaging and editing software is present is shown on the right side of the figure. When the software-specific information has a configuration of a table T12, if addition of constellation search software is detected during wireless connection with a high sensitivity imaging module which mounts a wide-angle lens, the software-specific information is changed into a configuration of a table T13. In the table T13, the added constellation search software is newly associated with the set of the high-sensitivity imaging module and the wide-angle lens.

When the software-specific information has a configuration of a table T14, if deletion of night view software is detected during wireless connection with a high-sensitivity imaging module which mounts a wide-angle lens, the software-specific information is changed into a configuration of a table T15. In the table T15, the deleted night view software is deleted from the host apparatus from all the sets of the imaging module identification information and the optical module identification information.

Figure 25:
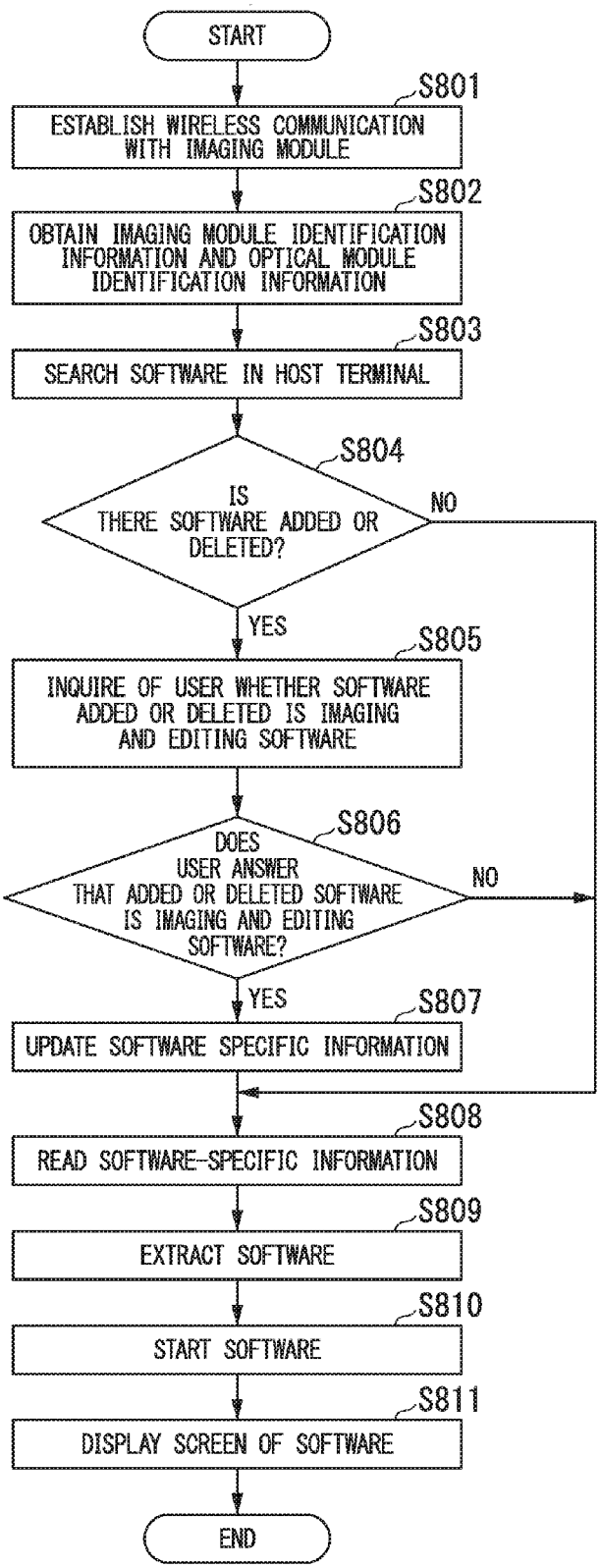
FIG. 25 is a flowchart illustrating an example of the flow of processes of the imaging operation terminal according to Modification Example 8 of the first embodiment.

FIG. 25 is a flowchart illustrating an example of the flow of processes of the imaging operation terminal 18 according to Modification Example 8 of the first embodiment. Since processes of steps S801 and S802 are the same as the processes of steps S201 and S202 in FIG. 5, a description thereof will not be repeated here.

Next, in step S803, the detecting section 109 searches imaging and editing software in the host apparatus, and obtains a list of the software in the host apparatus.

Then, in step S804, the detecting section 109 determines whether there is software added or deleted from the list of the imaging and editing software retained by the detecting section 109 in the list of the imaging and editing software in the host apparatus obtained through the search. If it is determined that the added or deleted imaging and editing software is present (YES), the detecting section 109 advances the process to step S805. On the other hand, if it is determined that the added or deleted imaging and editing software is not present (NO), the detecting section 109 advances the process to step S808.

Then, in step S805, the detecting section 109 inquires of the user whether the software added to or deleted from the set of the current modules in the software-specific information is the imaging and editing software.

Then, in step S806, the detecting section 109 determines an answer of the user to the inquiry of whether the added or deleted software is the imaging and editing software. If the user answers that the added or deleted software is the imaging and editing software to the inquiry of whether the added or deleted software is the imaging and editing software (YES), the detecting section 109 advances the process to step S807. If the user answers that the added or deleted software is not the imaging and editing software to the inquiry of whether the added or deleted software is the imaging and editing software (NO), the detecting section 109 advances the process to step S808.

Then, in step S807, the information updating section 108h updates the software-specific information. For example, when the detecting section 109 detects the addition of the imaging and editing software, the information updating section 108h performs the updating while associating software identification information used to identify the added imaging and editing software with the set of the imaging module identification information and the optical module identification information received by the communicating section 101, in the software-specific information stored in the storage section 102, using the changed item inputted from the detecting section 109, for example. On the other hand, for example, when the detecting section 109 detects the deletion of the imaging and editing software, the information updating section 108h deletes the software identification information used to identify the imaging and editing software deleted from the host apparatus, from all the sets of the imaging module identification information and the optical module identification information in the software-specific information stored in the storage section 102, using the changed item input from the detecting section 109, for example.

Since the processes of steps S808 to S811 are the same as the processes of steps S203 to S206 in FIG. 5, description thereof will not be repeated. Here, the processes of the present flowchart end.

As described above, in the imaging operation terminal 18 according to Modification Example 8, the detecting section 109 detects the addition or deletion of the imaging and editing software. Further, if the addition or deletion is detected, the detecting section 109 inquires of the user whether the added or deleted software is the imaging and editing software. Further, if the user answers that the added or deleted software is the imaging and editing software, the information updating section 108h updates the software-specific information. That is, using the function of the information updating section 108h, even though there is the addition or deletion of the imaging and editing software, the user has only to answer whether the added or deleted software is the imaging and editing software, and thus, it is possible to update the software-specific information. Thus, the imaging operation terminal 18 according to Modification Example 8 can reduce an effort of the user for the change of the software-specific information, in addition to the effects of Modification Example 1.

The information updating section 108h may update the software-specific information at an arbitrary time designated by the user. The information updating section 108h may update the software-specific information when the imaging and editing software is added or deleted. In this case, the detecting section 109 and the information updating section 108h may perform the following processes. When the software is added or deleted, the detecting section 109 may inquire of the user whether the added or deleted software is the imaging and editing software. Further, if the fact that the added or deleted imaging and editing software is the imaging and editing software related to an image is received through the operating section 106h by operation of the user, the detecting section 109 may notify the information updating section 108h of the changed item. Further, the information updating section 108h may update the software-specific information using the changed item notified from the detecting section 109.

Modification Example 9

Subsequently, Modification Example 9 of the first embodiment will be described. An imaging operation terminal 19 of Modification Example 9 additionally writes the set of the imaging module identification information and the optical module identification information to the retaining software-specific information, when the imaging operation terminal 19 receives imaging module identification information and optical module identification information and when the imaging module identification information and the optical module identification information is not present in a retaining list.

Figure 26:
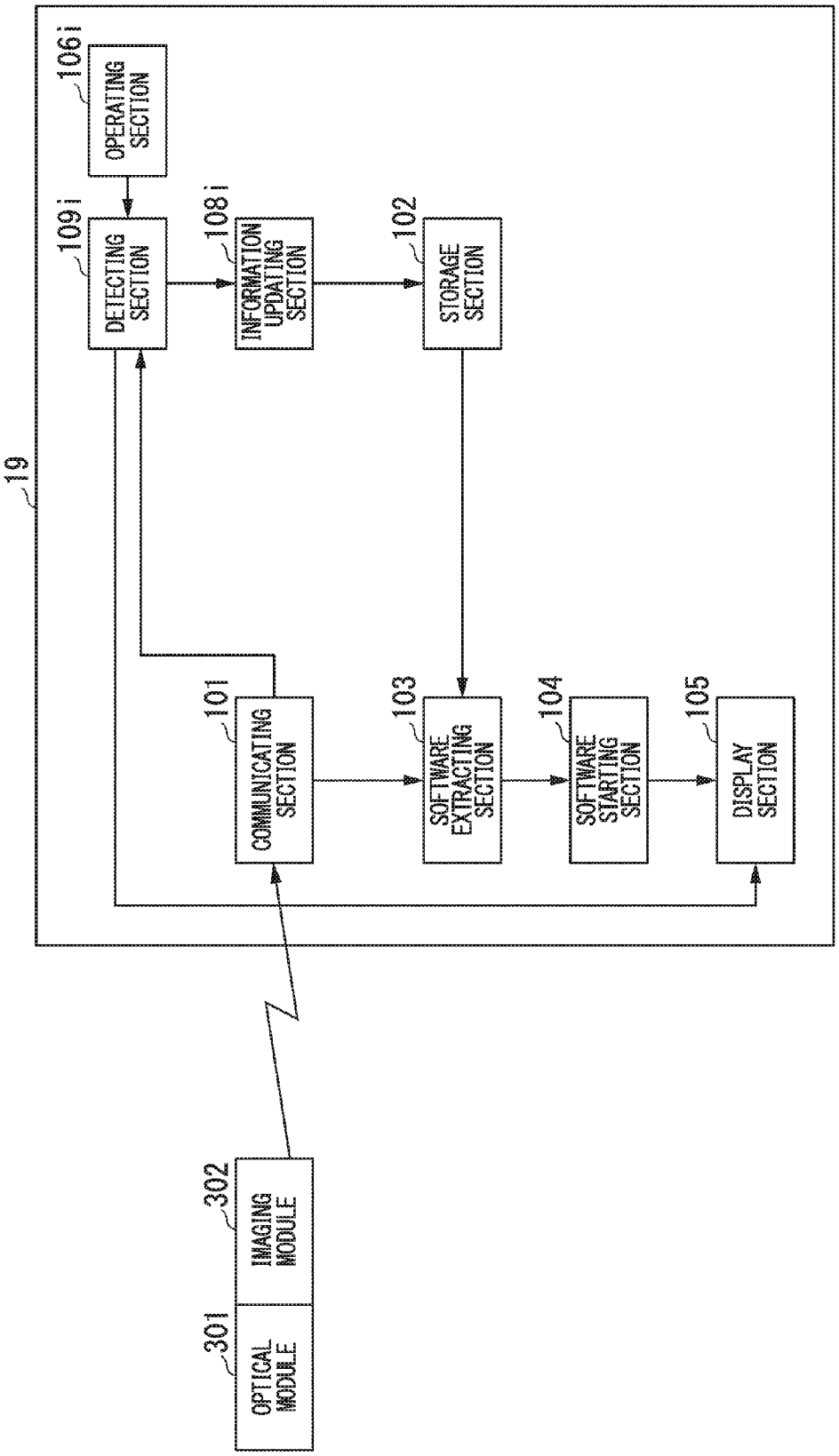
FIG. 26 is a block diagram schematically illustrating a configuration of an imaging operation terminal according to Modification Example 9 of the first embodiment.

FIG. 26 is a block diagram schematically illustrating a configuration of the imaging operation terminal 19 according to Modification Example 9 of the first embodiment. The same reference numerals are given to the same components as in FIG. 21, and detailed a description thereof will not be repeated here. The configuration of the imaging operation terminal 19 according to Modification Example 9 is different from the configuration of the imaging operation terminal 17 according to Modification Example 7 in FIG. 21 in that the information updating section 108 is changed to an information updating section 108i and an operating section 106i and a detecting section 109i are added.

The detecting section 109i obtains the imaging module identification information and the optical module identification information received by the communicating section 101. The detecting section 109i detects that at least one piece the imaging module identification information and optical module identification information received by the communicating section 101 is not present in the imaging module identification information and optical module identification information stored in the storage section 102.

Subsequently, a specifying example of the detection process in the detecting section 109i will be described. The detecting section 109i retains an imaging module registration list that is a list of imaging modules identified by the imaging module identification information, for example. Here, the imaging module identification information is stored in the storage section 102 in advance. Further, the detecting section 109i retains an optical module registration list that is a list of optical modules identified by the optical module identification information, for example. Here, the optical module identification information is stored in the storage section 102 in advance. For example, the detecting section 109i identifies the imaging module identification information received by the communicating section 101, and determines whether the imaging module specified through the identification is present in the imaging module registration list. If the specified imaging module is not present in the imaging module registration list, the detecting section 109i adds the imaging module identification information to the changed item. For example, the detecting section 109i identifies the optical module identification information received by the communicating section 101, and determines whether the optical module specified through the identification is present in the optical module registration list. If the specified optical module is not present in the optical module registration list, the detecting section 109i adds the optical module identification information to the changed item. Further, the detecting section 109i notifies the information updating section 108i of the changed item.

If the detecting section 109i detects the imaging module identification information or the optical module identification information that is not stored in the storage section 102, the information updating section 108i additionally writes the set of the imaging module identification information and the optical module identification information received by the communicating section 101 in the set of the imaging module identification information and the optical module identification information included in the software-specific information stored in the storage section 102. Specifically, for example, the information updating section 108i additionally writes the set of the imaging module identification information and the optical module identification information received by the communicating section 101 in the software-specific information stored in the storage section 102. In this case, for example, the information updating section 108i makes the columns of the software identification information corresponding to the set of the imaging module identification information and the optical module identification information blanks.

On the other hand, if the detecting section 109i does not detect any one of the imaging module identification information and the optical module identification information that is not stored in the storage section 102, the information updating section 108i does not update the software-specific information.

Figure 27:
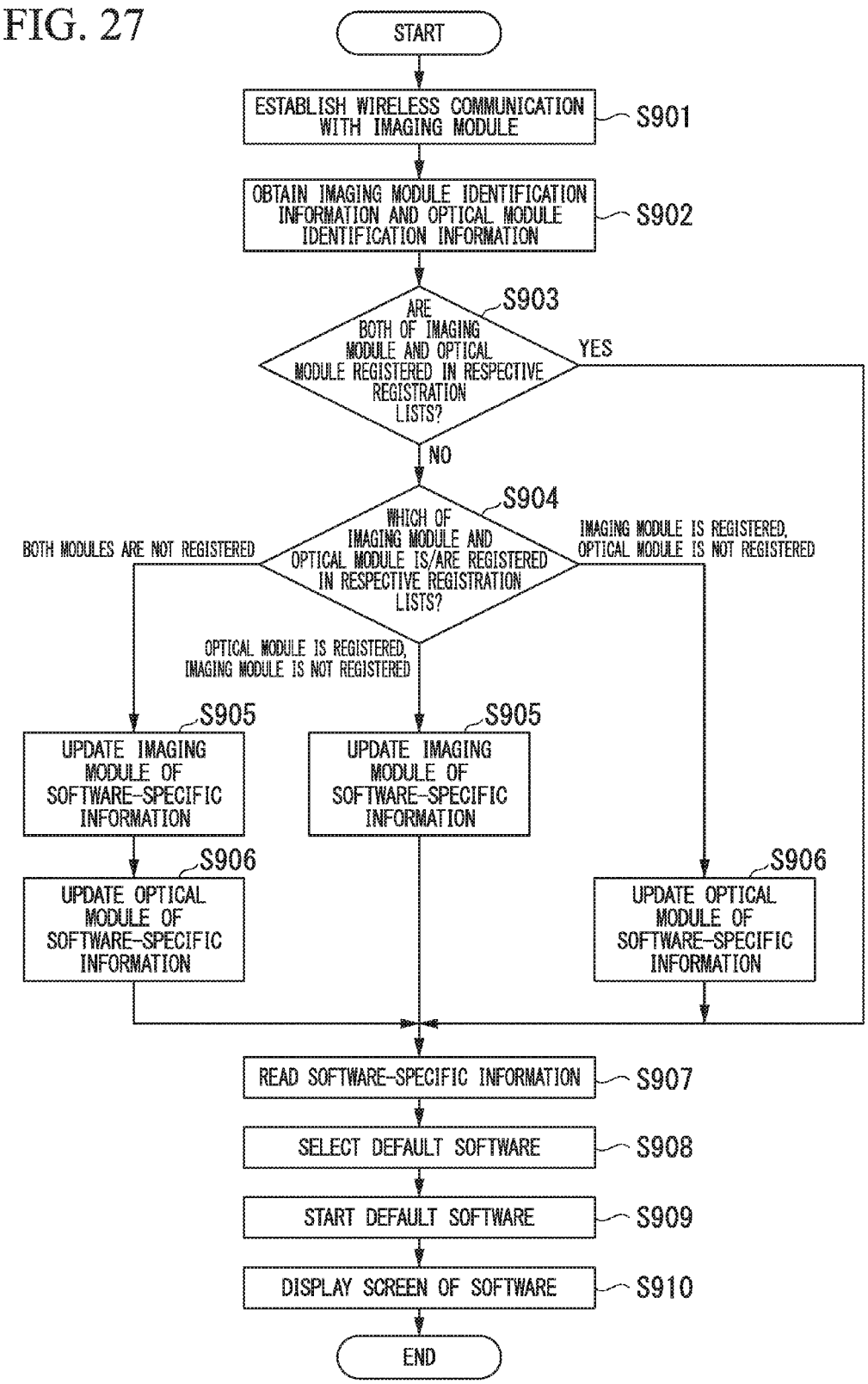
FIG. 27 is a flowchart illustrating an example of the flow of processes of the imaging operation terminal according to Modification Example 9 of the first embodiment.

FIG. 27 is a flowchart illustrating an example of the flow of processes of the imaging operation terminal 19 according to Modification Example 9 of the first embodiment. Since the processes of steps S901 and S902 are the same as the processes of steps S201 and S202 in FIG. 5, a description thereof will not be repeated here.

Then, in step S903, the detecting section 109i determines whether both of the imaging module and the optical module which is mounted to the imaging module are registered on the appropriate corresponding registration lists. If one of the modules is not registered or both of the modules are not registered (NO), the detecting section 109i advances the process to step S904. On the other hand, if both of the imaging module and the optical module are registered (YES), the detecting section 109i advances the process to step S907.

In step S904, the detecting section 109i determines which of the imaging module and the optical module is/are registered in respective registration list. If both of the modules are not registered, the detecting section 109i advances the process to step S905. In addition, if the optical module is registered on the optical module list and the imaging module is not registered on the imaging module list, the detecting section 109i also advances the process to step S905. On the other hand, if the imaging module is registered to the imaging module list, and if the optical module is not registered to the optical module list, the detecting section 109i advances the process to step S906.

In step S905, the information updating section 108i additionally writes the set of the imaging module identification information and the optical module identification information received by the communicating section 101 in the software-specific information. Thus, the set of the imaging module identification information used to identify the imaging module that is currently connected to the communicating section 101 and the optical module identification information used to identify the optical module which is mounted to the imaging module is additionally stored in the storage section 102. The detecting section 109i additionally writes the currently connected imaging module in the imaging module registration list. In step S904, if it is determined that both of the imaging module and the optical module are not registered on the appropriate corresponding registration list, the detecting section 109i advances the process to step S906. On the other hand, in step S904, if it is determined that the optical module is registered to the optical module list and the imaging module is not registered to the imaging module lists, the detecting section 109i advances the process to step S907.

In step S906, the information updating section 108i additionally writes the set of the imaging module identification information and the optical module identification information received by the communicating section 101 to the software-specific information. Thus, the set of the imaging module identification information used to identify the imaging module that is currently connected to the communicating section 101 and the optical module identification information used to identify the optical module which is mounted to the imaging module is additionally stored in the storage section 102. The detecting section 109i additionally writes the optical module which is mounted to the currently connected imaging module in the optical module registration list.

Then, in step S907, the software extracting section 103 reads the software-specific information stored in the storage section 102.

Then, in step S908, the software extracting section 103 selects default software, since there is no software identification information corresponding to the combination of the imaging module identification information and the optical module identification information received by the communicating section 101.

Then, in step S909, the software starting section 104 starts the default software.

Then, in step S910, the display section 105 displays a screen of the default software started by the software starting section 104. Here, the processes of the present flowchart end.

As described above, in the imaging operation terminal 19 according to Modification Example 9, the detecting section 109i detects whether the imaging module identification information and the optical module identification information received by the communicating section 101 are present in the imaging module registration list and the optical module registration list. Further, if the detecting section 109i detects the absence of one or both imaging module identification information and the optical identification information, the information updating section 108i additionally writes the set of the imaging module identification information and the optical module identification information received by the communicating section 101 to the storage section 102. Thus, even if one or both of the imaging module and the optical module is changed, the information updating section 108i performs the additional writing in the imaging module identification information and the optical module identification information stored in the storage section 102, and thus, it is not necessary for the user to additionally write the module information. Thus, the imaging operation terminal 19 according to Modification Example 9 can reduce an effort of the user for the change of the module information, in addition to the effects of the Modification Example 1. Further, since the imaging operation terminal 19 changes the module information without a manual operation, it is possible to prevent an artificial change error.

When the imaging module identification information or the optical module identification information is not registered in each registration list, the detecting section 109i may display a message which means starting the default software in the display section 105. Thus, it is possible to notify the user of the message which means starting the default software. When receiving the notification, the user may approve the starting of the default software, or may instruct starting of arbitrary imaging and editing software. In this case, the operating section 106i receives an operation of the user's approval or an operation of the user's starting instruction for certain software, and outputs operation information indicating the received operation to the detecting section 109i. Further, if the operation information inputted from the operating section 106i is the approval operation, the detecting section 109i may cause the software starting section 104 to start up the default software. On the other hand, if the operation information inputted from the operating section 106i is the starting instruction operation of specific imaging and editing software, the detecting section 109i may cause the software starting section 104 to start up the specific imaging and editing software.

Modification Example 10

Subsequently, Modification Example 10 of the first embodiment will be described. An imaging operation terminal 19j of Modification Example 10 is a further modification of the imaging operation terminal 19 of Modification Example 9. The imaging operation terminal 19j of Modification Example 10 searches and obtains imaging and editing software suitable for the imaging module identification information and the optical module identification information from an external database, when the imaging operation terminal 19 receives imaging module identification information and optical module identification information and when the imaging module identification information or the optical module identification information is not present in a retaining list.

Figure 28:
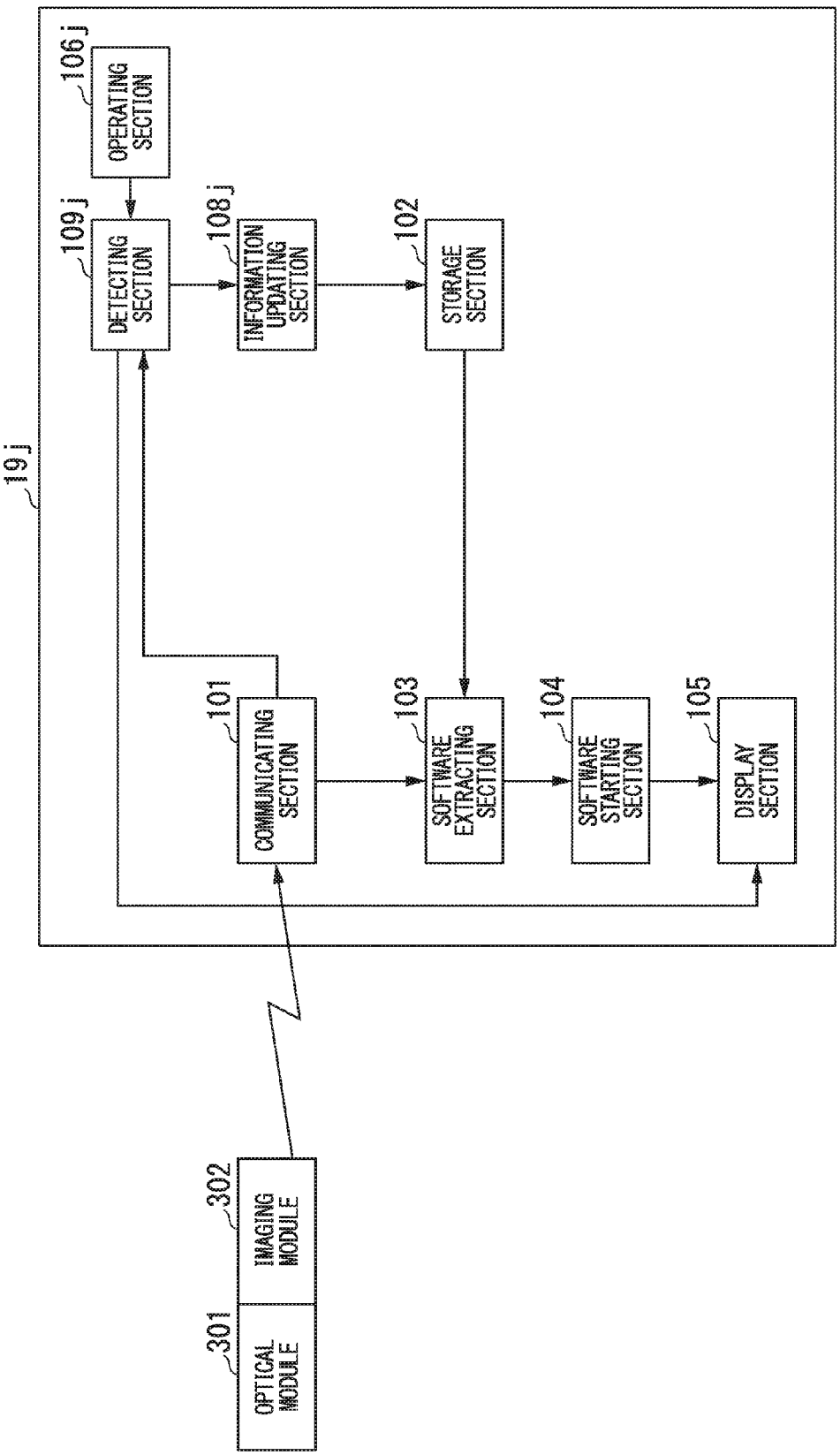
FIG. 28 is a block diagram schematically illustrating a configuration of an imaging operation terminal according to Modification Example 10 of the first embodiment.

FIG. 28 is a block diagram schematically illustrating a configuration of an imaging operation terminal 19j according to Modification Example 10 of the first embodiment. The same reference numerals are given to the same components as in FIG. 26, and a detailed description thereof will not be repeated here. The configuration of the imaging operation terminal 19j according to Modification Example 10 is different from the configuration of the imaging operation terminal 19 according to Modification Example 9 in FIG. 26 in that the information updating section 108i is changed to an information updating section 108j, the operating section 106i is changed to an operating section 106j and the detecting section 109i is changed to a detecting section 109j.

If at least one of the imaging module identified by the imaging module identification information received by the communicating section 101 and the optical module identified by the optical module identification information received by the communicating section 101 is not registered in the imaging module registration list or the optical module registration list, the detecting section 109j performs the following processes. The detecting section 109j searches imaging and editing software corresponding to the imaging module or the optical module that is not registered, from the external database. If the imaging and editing software is not found through the search, the detecting section 109j sets the imaging module identification information received by the communicating section 101 and the optical module identification information received by the communicating section 101 as changed items, and notifies the information updating section 108j of the result.

On the other hand, if the corresponding imaging and editing software is found through the search, the detecting section 109j displays a screen for inquiring of a user whether the corresponding software is to be installed in the display section 105. Thus, it is possible to inquire of the user whether the corresponding software is to be installed.

The operating section 106j receives an operation relating to an answer to the inquiry, and outputs operation information indicating the received operation to the detecting section 109j. Further, if the operation information input from the operating section 106j is an acceptance operation, the detecting section 109j downloads the imaging and editing software to be installed. Further, the detecting section 109j sets software identification information used to identify the software which is found through the search, the imaging module identification information received by the communicating section 101 and the optical module identification information received by the communicating section 101 as changed items, and notifies the information updating section 108*j* of the result.

On the other hand, if the operation information inputted from the operating section 106*j* is a non-acceptance operation, for example, the detecting section 109*j* sets the imaging module identification information received by the communicating section 101 and the optical module identification information received by the communicating section 101 as changed items without download or installation of the searched and found imaging and editing software, and notifies the information updating section 108*j* of the result.

The information updating section 108*j* updates the software-specific information to correspond to the changed items notified from the detecting section 109*j*. Specifically, for example, if the imaging and editing software which is found through search by the detecting section 109*j* is installed, the information updating section 108*j* associates the software identification information included in the changed items inputted from the detecting section 109*j* with the set of the imaging module identification information and the optical module identification information included in the changed items inputted from the detecting section 109*j*. And then, the information updating section 108*j* additionally writes to the software-specific information in the storage section 102.

If the detecting section 109*j* cannot find the imaging and editing software through the search, or if the operating section 106*j* receives the non-acceptance operation for the installation of the imaging and editing software found through the search, the information updating section 108*j* additionally writes the set of the imaging module identification information and the optical module identification information included in the changed items inputted from the detecting section 109*j* to the software-specific information. Here, the software identification information is not associated with the set of the imaging module identification information and the optical module identification information, and the column of the software identification information is made blank.

Figure 29:
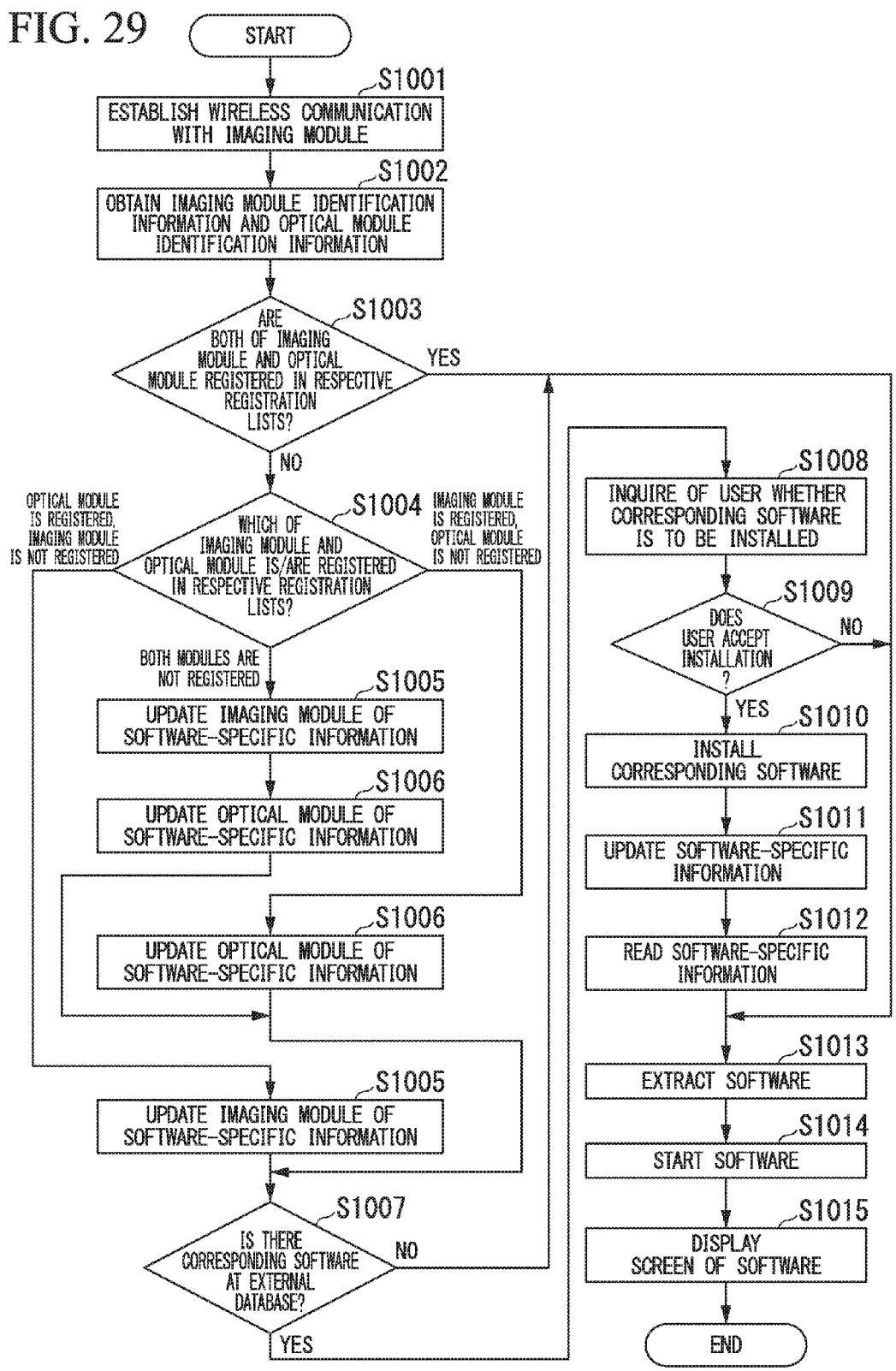
FIG. 29 is a flowchart illustrating an example of the flow of processes of the imaging operation terminal according to Modification Example 10 of the first embodiment.

FIG. 29 is a flowchart illustrating an example of the flow of processes of the imaging operation terminal 19*j* according to Modification Example 10 of the first embodiment. Since processes of steps S1001 and S1002 are the same as the processes of steps S201 and S202 in FIG. 5, a description thereof will not be repeated here.

Then, in step S1003, the detecting section 109*j* determines whether both of the imaging module and the optical module which is mounted to the imaging module are registered on the respective registration lists. If one or both of the modules is not registered (NO), the detecting section 109*j* advances the process to step S1004. On the other hand, if both of the imaging module and the optical module are registered (YES), the detecting section 109*j* advances the process to step S1013.

In step S1004, the detecting section 109*j* determines whether the imaging module and the optical module are registered on respective registration lists. If both of the modules are not registered, the detecting section 109*j* advances the process to step S1005. If the optical module is registered to the optical module list and the imaging module is not registered to the imaging module list, the detecting section 109*j* also advances the process to step S1005. If the imaging module is registered to the imaging module list, and if the optical module is not registered to the optical module list, the detecting section 109*j* advances the process to step S1006.

In step S1005, the information updating section 108*j* additionally writes the set of the imaging module identification information and the optical module identification information received by the communicating section 101 to the software-specific information. Thus, the set of the imaging module identification information used to identify the imaging module that is currently connected to the communicating section 101 and the optical module identification information used to identify the optical module which is mounted to the imaging module is additionally stored in the storage section 102. The detecting section 109*j* additionally writes the currently connected imaging module in the imaging module registration list. In step S1004, if it is determined that both of the imaging module and the optical module are not registered to the respective registration list, the detecting section 109*j* advances the process to step S1006. On the other hand, in step S1004, if it is determined that the optical module is registered to the optical module list and the imaging module is not registered to the imaging module list, the detecting section 109*j* advances the process to step S1007.

In step S1006, the information updating section 108*j* additionally writes the set of the imaging module identification information and the optical module identification information received by the communicating section 101 to the software-specific information. Thus, the set of the imaging module identification information used to identify the imaging module that is currently connected to the communicating section 101 and the optical module identification information used to identify the optical module which is mounted to the imaging module is additionally stored in the storage section 102. The detecting section 109*j* additionally writes the optical module which is mounted to the currently connected imaging module in the optical module registration list.

Then, in step S1007, the detecting section 109*j* searches whether the imaging and editing software corresponding to the currently connected imaging module and the optical module is present in the external database. If the corresponding imaging and editing software is present (YES), the detecting section 109*j* advances the process to step S1008. If the corresponding imaging and editing software is not present (NO), the detecting section 109*j* advances the process to step S1013.

In step S1008, the detecting section 109*j* inquires of the user whether the imaging and editing software is to be installed.

Then, in step S1009, the detecting section 109*j* determines whether the user accepts the installation of the imaging and editing software. If the user accepts the installation (YES), the detecting section 109*j* advances the process to step S1010. If the user does not accept the installation (NO), the detecting section 109*j* advances the process to step S1013.

Then, in step S1010, the detecting section 109*j* downloads the corresponding imaging and editing software to be installed.

Then, in step S1011, the detecting section 109*j* associates software identification information used to identify the corresponding imaging and editing software with the set of the imaging module identification information used to identify the currently connected imaging module and the optical module identification information used to identify the optical module which is mounted to the imaging module, to be additionally written in the software-specific information stored in the storage section 102.

Then, in step S1012, the software extracting section 103 reads the software-specific information stored in the storage section 102.

Then, in step S1013, the software extracting section 103 extracts the software identification information corresponding to the combination of the imaging module identification information and the optical module identification information received by the communicating section 101 from the software-specific information stored in the storage section 102.

Then, in step S1014, the software extracting section 103 extracts the software identification information, and then, the software starting section 104 starts the imaging and editing software identified by the software identification information. Here, if the software identification information corresponding to the combination of the imaging module identification information and the optical module identification information is not stored in the storage section 102, and thus, the software extracting section 103 cannot extract the software identification information, the software starting section 104 starts the default software.

Then, in step S1015, the display section 105 displays a screen of the software started by the software starting section 104. Here, the processes of the present flowchart end.

As described above, in the imaging operation terminal 19*j* according to Modification Example 10, the detecting section 109*j* detects whether the imaging module identification information and the optical module identification information received by the communicating section 101 is present in the imaging module registration list and the optical module registration list. Further, if the detecting section 109*j* detects the absence of the imaging module identification information and the optical module identification information, the detecting section 109*j* downloads and installs the imaging and editing software corresponding to the imaging module identification information or the optical module identification information that is not stored in the storage section 102 from the external database.

Thus, in the imaging operation terminal 19*j* according to Modification Example 10, since the detecting section 109*j* searches and finds the corresponding imaging and editing software, it is possible to reduce an effort of the user for search of the imaging and editing software, in addition to the effects of Modification Example 9.

Second Embodiment

Figure 30:
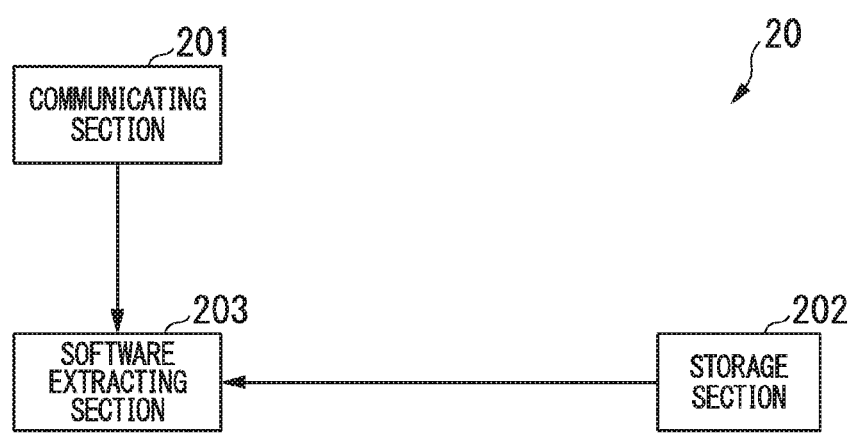
FIG. 30 is a block diagram schematically illustrating a configuration of an imaging operation terminal according to a second embodiment.

Subsequently, a second embodiment will be described. FIG. 30 is a block diagram schematically illustrating a configuration of an imaging operation terminal 20 according to the second embodiment. The imaging operation terminal 20 includes a communicating section 201, a storage section 202, and a software extracting section 203. Imaging and editing software according to the second embodiment performs at least one of an imaging operation of an imaging module which mounts an optical module, an operation of an accessory used together with the imaging module, and editing of an image imaged by the imaging module.

The communicating section 201 receives accessory identification information used to identify the accessory used together with the imaging module, when imaging module identification information used to identify the imaging module and optical module identification information used to identify the optical module which is mounted to the imaging module are received wirelessly from the imaging module. Here, the accessory is a module used together with the imaging module, which may include a strobe (hereinafter, referred to as a flash), a platform, a tripod, a finder or a global positioning system (GPS) receiver, for example. The communicating section 201 outputs the received imaging module identification information, optical module identification information and accessory identification information to the software extracting section 203.

In the storage section 202, software-specific information in which software identification information used to identify imaging and editing software is associated with each combination of the imaging module identification information used to identify the imaging module which mounts the optical module, the optical module identification information and the accessory identification information used to identify the accessory used together with the imaging module, is stored.

The software extracting section 203 extracts the software identification information corresponding to the combination of the imaging module identification information, the optical module identification information and the accessory identification information received by the communicating section 201 from the storage section 202.

FIG. 31 is a table T16 illustrating an example of the software-specific information stored in the storage section 202. In the table T16, sets of imaging module identification information, optical module identification information, accessory identification information and software identification information are shown. For example, on the first line of the table T16, when the imaging module identification information indicates a high-sensitivity imaging module, the optical module identification information indicates a lens, and the accessory identification information indicates a flash, image synthesizing software and ISO management software are associated with each other as the software identification information. The image synthesizing software is synthesizing software that synthesizes a night view and a person, for example. The ISO management software is software that manages ISO sensitivity of the imaging module and an F-value of the optical module. In this example, when the combination of the high-sensitivity imaging module and the flash is used, since imaging is performed at a dark place in many cases, image synthesizing software and ISO management software having high possibilities to be used for the imaging at the dark place are associated with each other. In this case, if the flash and the lens are mounted to the high-sensitivity imaging module, the software extracting section 203 extracts the image synthesizing software and the ISO management software. Thus, when the user combines the high-sensitivity imaging module and the flash for use, the software extracting section 203 can extract the image synthesizing software and the ISO management software suitable for the imaging using the combination, and thus, it is possible to reduce an effort of the user for selection of the imaging and editing software.

On the second line of the table T16, tailing software that tails wild birds or animals is associated with a combination of the imaging module, a telephoto lens and an electric camera platform. This software is provided considering that in many cases, wild birds or animals are observed when the imaging module is panned or tilted using the electric camera platform while observing a far distance by the telephoto lens. In this example, when the telephoto lens and the electric camera platform are mounted to the imaging module, the software extracting section 203 extracts the tailing software. Thus, when the user combines the telephoto lens and the electric camera platform for use, the software extracting section 203 can extract the tailing software suitable for the imaging using the combination, and thus, it is possible to reduce the effort of a user for selection of the imaging and editing software.

On the third line of the table T16, the imaging module, the lens and the tripod are associated with image stabilization switching software that switches on and off of image stabilization. This software is provided considering that the imaging module is fixed when the tripod is connected to the imaging module, and in many cases, an operation of switching off the image stabilization is performed. Thus, when the lens and the tripod are mounted to the imaging module, the software extracting section 203 extracts the image stabilization switching software. Thus, when the lens and the tripod are combined for use, the software extracting section 203 can extract the image stabilization switching software suitable for the imaging using the combination, and thus, it is possible to reduce an effort of the user for selection of the imaging and editing software.

Figure 32:
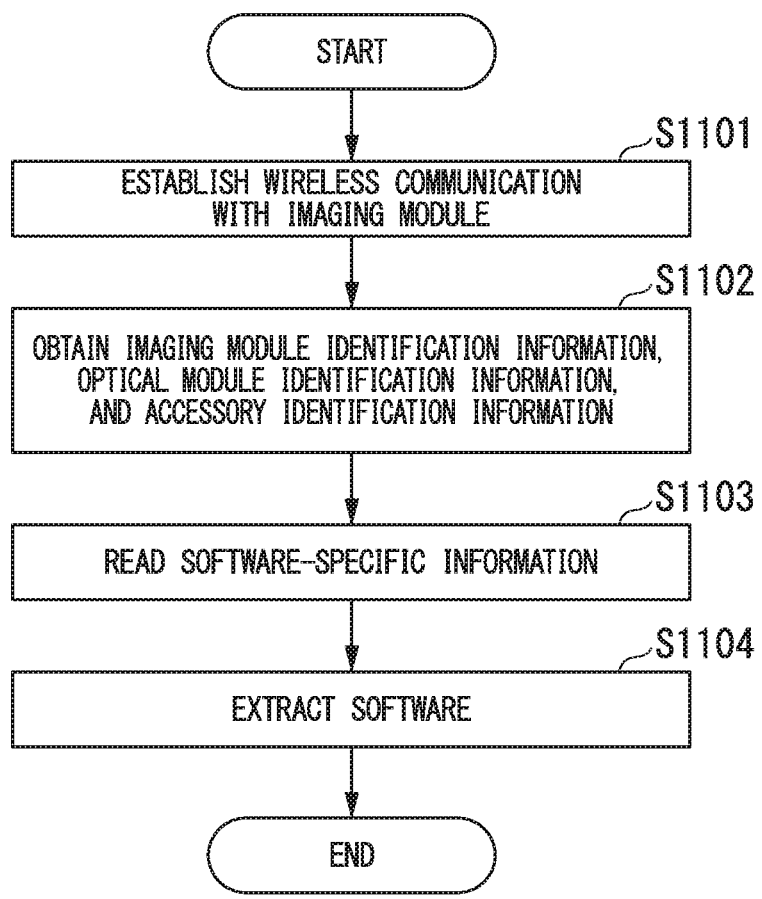
FIG. 32 is a flowchart illustrating an example of the flow of processes of the imaging operation terminal according to the second embodiment.

FIG. 32 is a flowchart illustrating an example of the flow of processes of the imaging operation terminal according to the second embodiment.

First, in step S1101, the communicating section 201 establishes wireless connection with the imaging module which mounts the optical module and capable of communicating with the accessory.

Then, in step S1102, the communicating section 201 obtains the imaging module identification information used to identify the imaging module, the optical module identification information used to identify the optical module which is mounted to the imaging module, and the accessory identification information used to identify the accessory used together with the imaging module, from the imaging module.

Then, in step S1103, the software extracting section 203 reads the software-specific information stored in the storage section 202.

Then, in step S1104, the software extracting section 203 extracts the software identification information corresponding to the combination of the imaging module identification information, the optical module identification information and the accessory identification information received by the communicating section 201, from the software-specific information. Here, the processes of the present flowchart end.

As described above, in the imaging operation terminal 20 according to the second embodiment, the software extracting section 203 can extract the software identification information corresponding to the combination of the imaging module identification information, the optical module identification information and the accessory identification information received by the communicating section 201. Thus, since the imaging operation terminal 20 selects the imaging and editing software according to the combination of the imaging module, the optical module and the accessory, it is thus possible to reduce the effort of a user for selection of the imaging and editing software.

Modification Example 1

Figure 33:
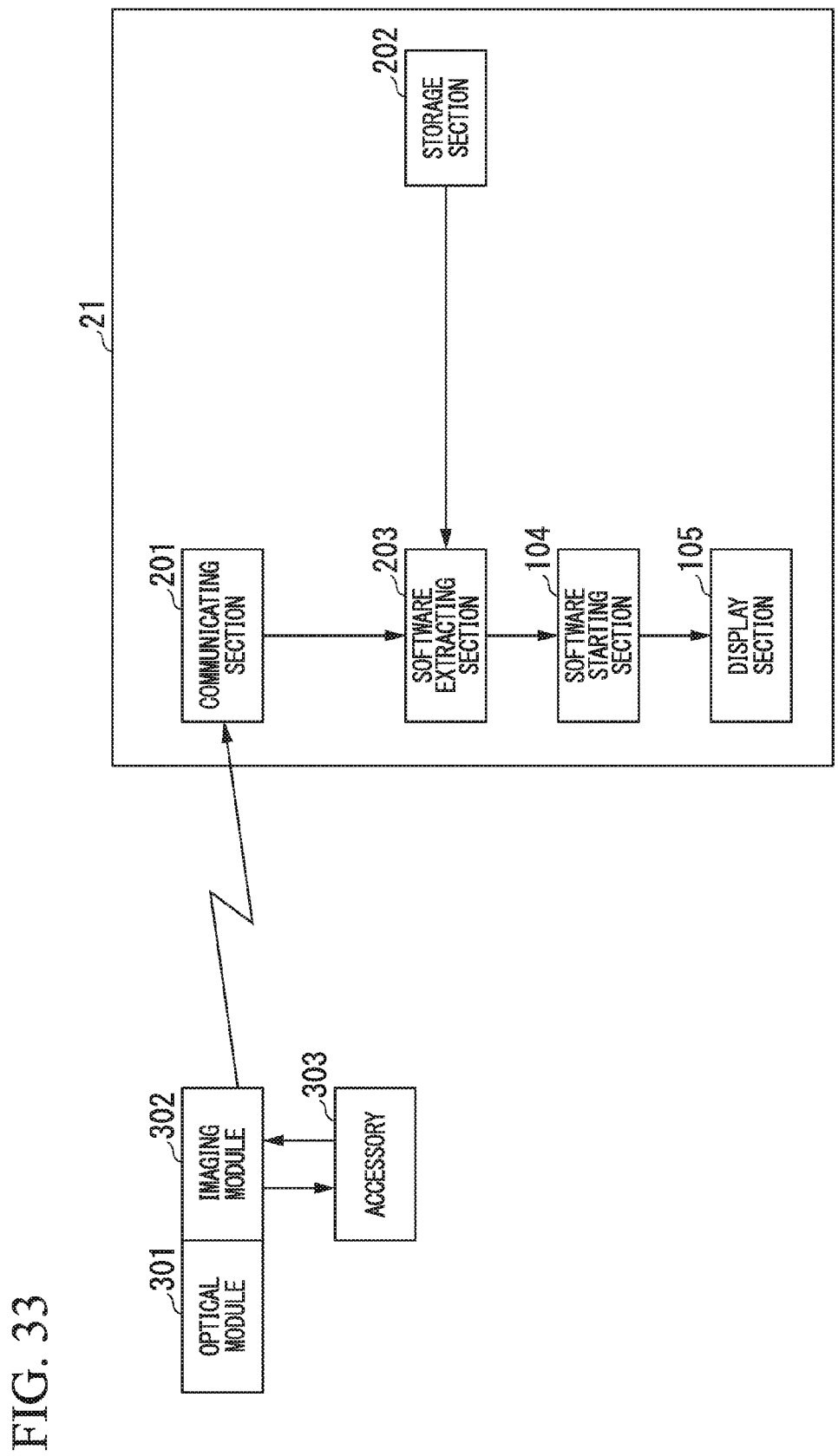
FIG. 33 is a block diagram schematically illustrating a configuration of an imaging operation terminal according to Modification Example 1 of the second embodiment.

Subsequently, Modification Example 1 of the second embodiment will be described. FIG. 33 is a block diagram schematically illustrating a configuration of an imaging operation terminal 21 according to Modification Example 1 of the second embodiment. The same reference numerals are given to the same components as in FIGS. 4 and 30, and a detailed description thereof will not be repeated here. The configuration of the imaging operation terminal 21 according to Modification Example 1 is different from the configuration of the imaging operation terminal 20 according to the second embodiment in FIG. 30 in that the software starting section 104 and the display section 105 are added. Since the software starting section 104 and the display section 105 are the same as the software starting section 104 and the display section 105 in FIG. 4, a detailed description thereof will not be repeated here.

The imaging module 302 is provided with the optical module 301 as an example. The optical module 301 includes, for example, an electrically rewritable non-volatile memory (not shown), in which optical module identification information used to identify the optical module 301 is stored in advance. A detachable detection switch (not shown) is provided in the vicinity of a mount opening part formed in the imaging module 302, and determines mounting state of the optical module 301 and the imaging module 302. If the mounting of the optical module 301 is detected, the imaging module 302 supplies power to the optical module 301 through a contact (not shown) of the imaging module 302 and a contact (not shown) of the optical module 301. The optical module 301 transmits, when supplied with the power, the optical module identification information stored in the non-volatile memory to the imaging module 302 through the contact (not shown) provided in the optical module 301. Thus, the imaging module 302 obtains the optical module identification information used to identify the optical module 301, and retains the obtained optical module identification information.

An accessory 303 retains accessory identification information used to identify the accessory itself as an example. The accessory 303 includes, for example, a communicating section (not shown). The communicating section transmits the accessory identification information retained in the accessory 303 to the imaging module 302 wirelessly. Thus, the imaging module 302 obtains the accessory identification information used to identify the accessory 303, and retains the obtained accessory identification information.

The accessory 303 may transmit, when electrically connected to the imaging module 302 through a communication contact, the accessory identification information used to identify the accessory itself to the imaging module 302 by wire.

The imaging module 302 includes a communicating section (not shown). The communicating section is capable of communicating with the communicating section 201 of the imaging operation terminal 22 wirelessly. Thus, the imaging operation terminal 21 controls the accessory 303 through the imaging module 302.

The communicating section 201 has the same function as that of the communicating section 101 according to the first embodiment, except for the following points. The communicating section 201 establishes wireless connection with the imaging module 302. If the wireless connection with the imaging module 302 is established, the communicating section 201 receives the imaging module identification information used to identify the imaging module 302, the optical module identification information used to identify the optical module 301 which is mounted to the imaging module 302, and the accessory identification information used to identify the accessory 303, from the imaging module 302 wirelessly.

Figure 34:
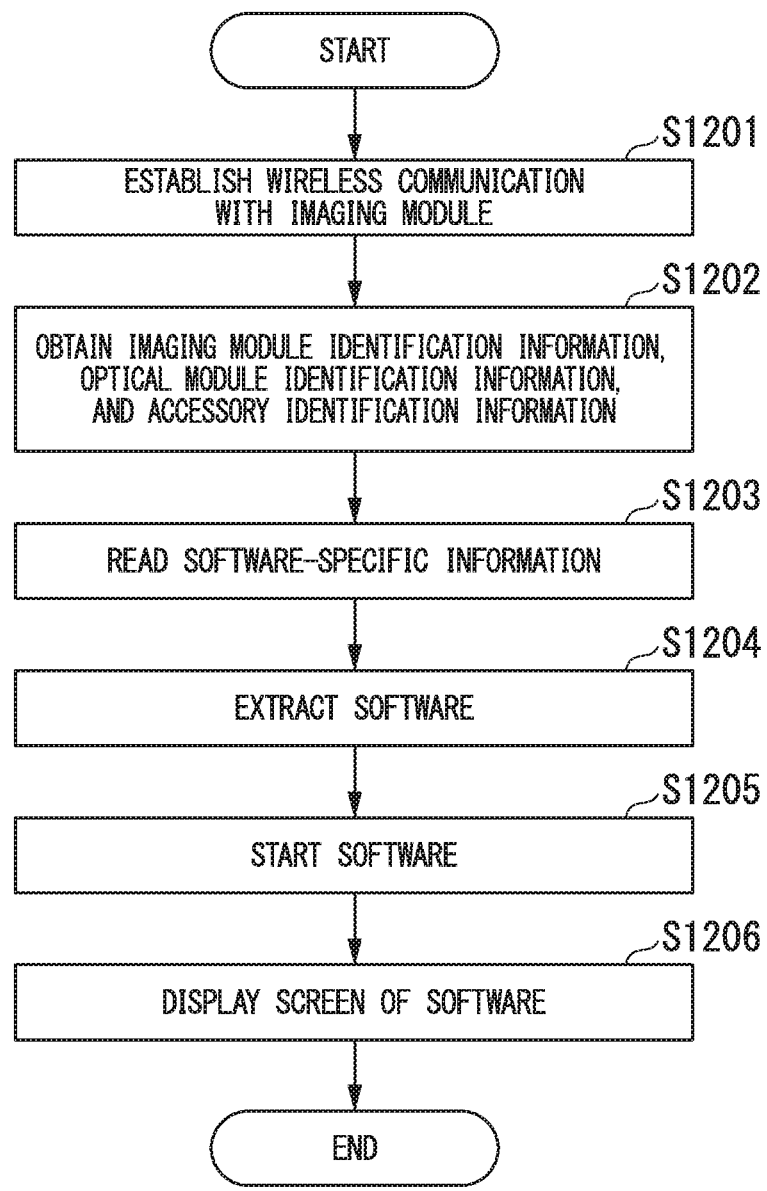
FIG. 34 is a flowchart illustrating an example of the flow of processes of the imaging operation terminal according to Modification Example 1 of the second embodiment.

FIG. 34 is a flowchart illustrating an example of the flow of processes of the imaging operation terminal 21 according to Modification Example 1 of the second embodiment.

First, in step S1201, the communicating section 201 establishes wireless connection with the imaging module 302 which mounts the optical module 301 and which is capable of communicating with the accessory 303.

Then, in step S1202, the communicating section 201 obtains the imaging module identification information used to identify the imaging module 302, the optical module identification information used to identify the optical module 301 which is mounted to the imaging module 302 and the accessory identification information used to identify the accessory 303, from the imaging module 302, wirelessly.

Then, in step S1203, the software extracting section 203 reads the software-specific information stored in the storage section 202.

Then, in step S1204, the software extracting section 203 extracts the software identification information corresponding to the combination of the imaging module identification information, the optical module identification information and the accessory identification information received by the communicating section 201 from the software-specific information.

Then, in step S1205, the software starting section 104 starts imaging and editing software identified by the software identification information extracted by the software extracting section 203.

Then, in step S1206, the display section 105 displays a screen of the imaging and editing software started by the software starting section 104. Here, the processes of the present flowchart end.

As described above, in Modification Example 1, when the wireless connection with the imaging module is established, the accessory identification information is received from the imaging module 302 wirelessly. Thus, in addition to the effects of the second embodiment, it is possible to control the accessory (for example, a flash connected to a hot shoe) 303 capable of being controlled from the imaging module 302. Since the software starting section 104 starts the imaging and editing software extracted by the software extracting section 203, when the imaging and editing software is imaging operation software, it is possible to reduce the time for preparation for the photographing. If the imaging and editing software is editing software, it is possible to reduce the time necessary for preparation for the image editing.

Modification Example 2

Figure 35:
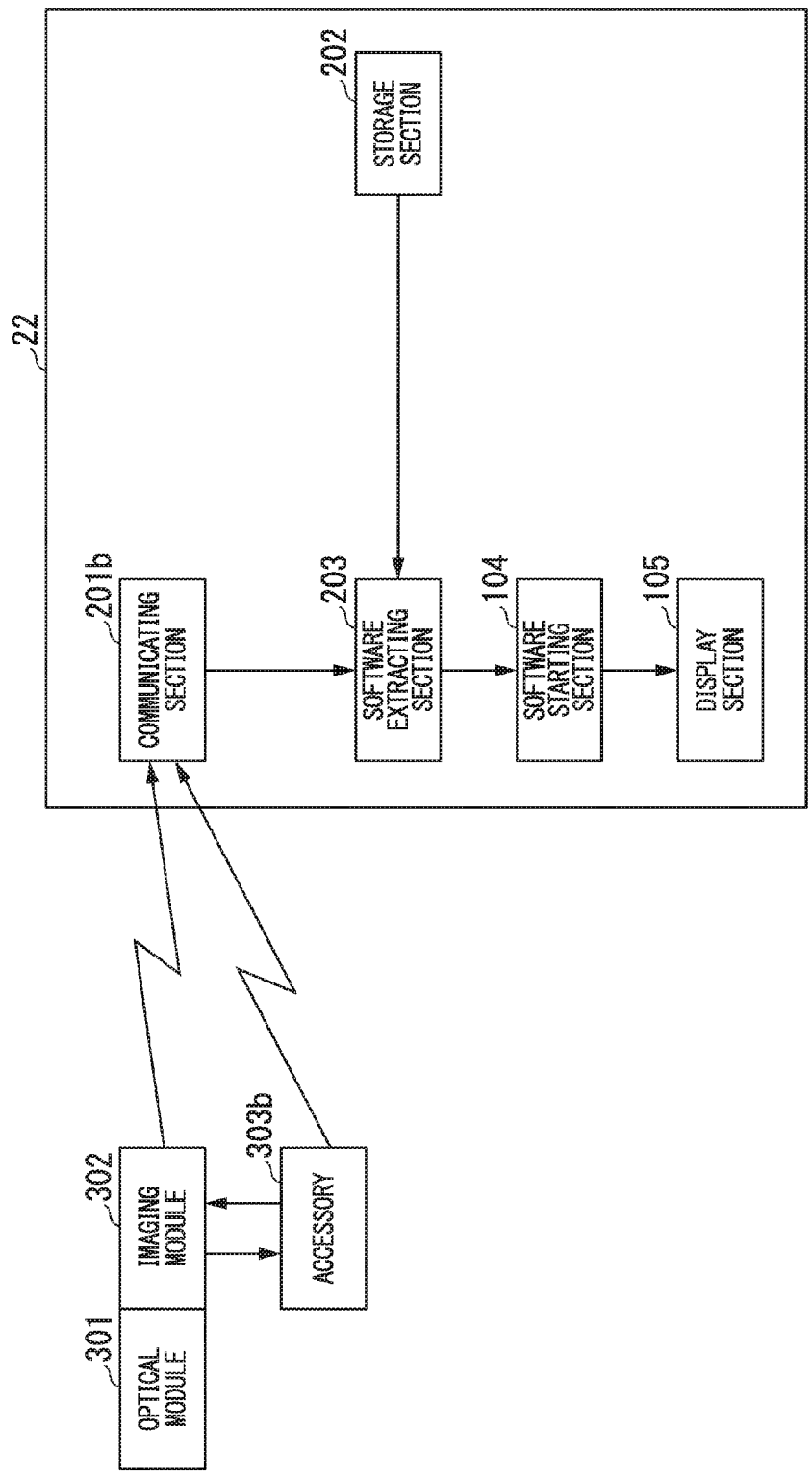
FIG. 35 is a block diagram schematically illustrating a configuration of an imaging operation terminal according to Modification Example 2 of the second embodiment.

Subsequently, Modification Example 2 of the second embodiment will be described. An imaging operation terminal 22 according to Modification Example 2 of the second embodiment is different from Modification Example 1 in that accessory identification information is directly received from an accessory 303b wirelessly. FIG. 35 is a block diagram schematically illustrating a configuration of the imaging operation terminal 22 according to Modification Example 2 of the second embodiment. The same reference numerals are given to the same components as in FIG. 33, and a detailed description thereof will not be repeated here. The configuration of the imaging operation terminal 22 according to Modification Example 2 is different from the configuration of the imaging operation terminal 21 according to Modification Example 1 in the second embodiment in FIG. 33 in that the communicating section 201 is changed to a communicating section 201b.

The imaging module 302 is provided with the optical module 301 as an example. The accessory 303b is connected to the imaging module 302 by wire or a wireless manner, and is capable of communicating with the imaging module 302. The accessory 303b retains accessory identification information (for example, a MAC address) used to identify the accessory itself. The accessory 303b includes a communicating section (not shown). The communicating section transmits the accessory identification information used to identify the accessory 303b to the communicating section 201b of the imaging operation terminal 22 wirelessly.

The communicating section 201b has the same function as that of the communicating section 201 according to Modification Example 1 of the second embodiment, except for the following points. The communicating section 201b establishes wireless connection with the imaging module 302 and also with the accessory 303b.

The communicating section 201b receives, when the wireless connection with the imaging module 302 is established, the imaging module identification information used to identify the imaging module 302 and the optical module identification information used to identify the optical module 301 which is mounted to the imaging module 302, from the imaging module 302 wirelessly. Further, the communicating section 201b receives, when the wireless connection with the accessory 303b is established, the accessory identification information used to identify the accessory 303b wirelessly.

As described above, in Modification Example 2, when the wireless connection with the accessory 303b is established, the communicating section 201b receives the accessory identification information used to identify the accessory 303b from the accessory 303b wirelessly. Thus, in addition to the effects of the second embodiment, the imaging operation terminal 22 can wirelessly control the accessory 303b that cannot be controlled from the imaging module 302.

In Modification Example 2, the imaging module 302 obtains the accessory identification information used to identify the accessory 303b from the accessory 303b, but the invention is not limited thereto. The imaging operation terminal 22 may display a screen for input of the accessory identification information of the accessory 303b connected to the imaging module 302 for inquiry to the user in the display section 105. In this case, the imaging operation terminal 22 may further include an operating section, which receives an operation of inputting the accessory identification information from the user, and may obtain the accessory identification information.

Modification Example 3

Figure 36:
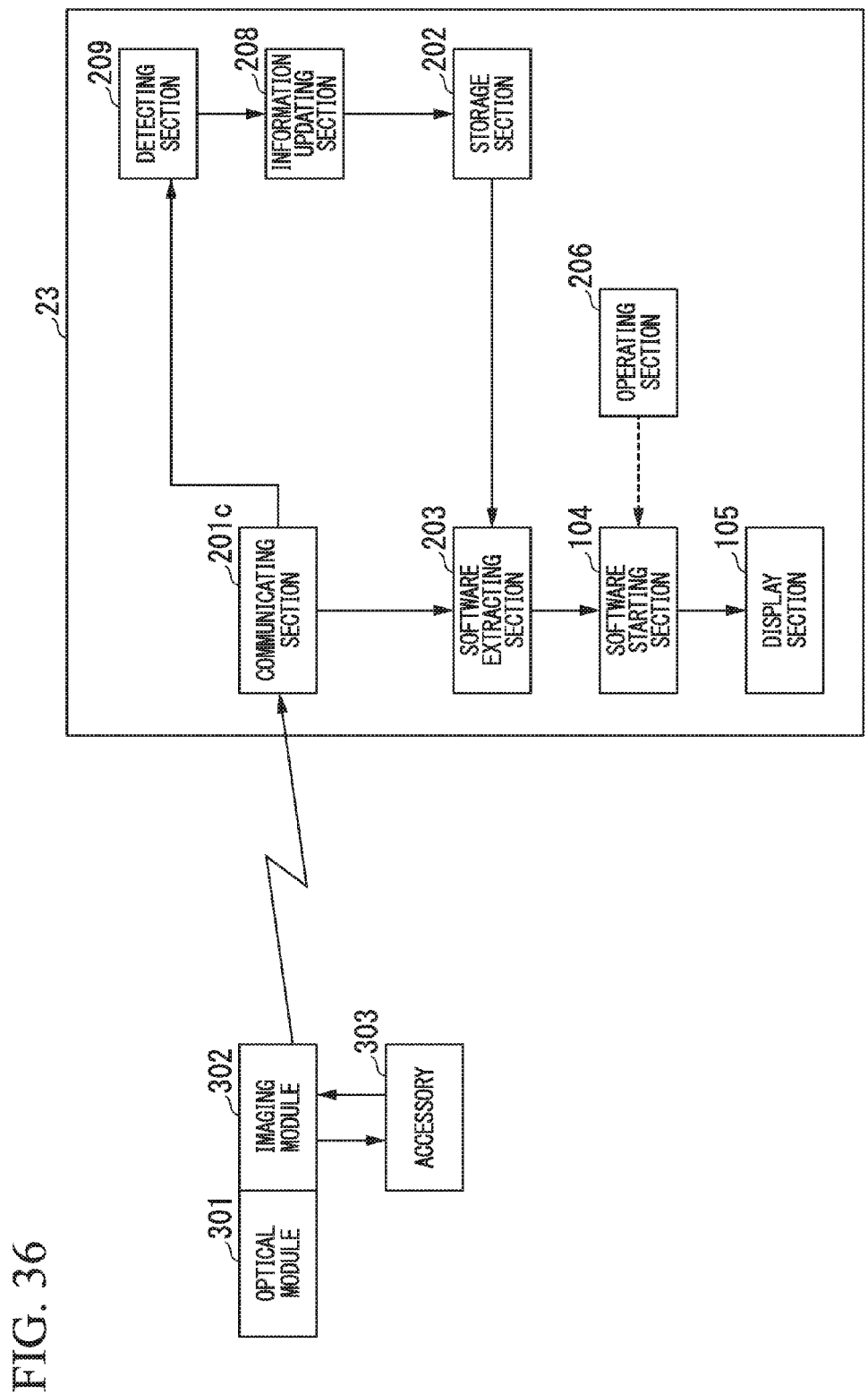
FIG. 36 is a block diagram schematically illustrating a configuration of an imaging operation terminal according to Modification Example 3 of the second embodiment.

Subsequently, Modification Example 3 of the second embodiment will be described. An imaging operation terminal 23 according to Modification Example 3 of the second embodiment is different from the imaging operation terminal 20 of the second embodiment in that retaining software-specific information is updated. FIG. 36 is a block diagram schematically illustrating a configuration of the imaging operation terminal 23 according to Modification Example 3 of the second embodiment. The same reference numerals are given to the same components as in FIG. 33, and a detailed description thereof will not be repeated here. The configuration of the imaging operation terminal 23 according to Modification Example 3 is different from the configuration of the imaging operation terminal 21 according to Modification Example 1 in the second embodiment in FIG. 33 in that the communicating section 201 is changed to a communicating section 201c and an operating section 206 through which a user's operation is received, an information updating section 208 and a detecting section 209 are added.

The communicating section 201c has the same function as that of the communicating section 201, except for the following points. The communicating section 201c additionally outputs the received imaging module identification information, optical module identification information and accessory identification information to the detecting section 209.

The detecting section 209 detects that accessory identification information that is not stored in the storage section 202 is received wirelessly by the communicating section 201c. For example, the detecting section 209 retains an accessory registration list that is a list of accessories in advance. A connected accessory is identified by the accessory identification information outputted from the communicating section 201c, and is compared with the retained accessory registration list. When the connected accessory is not registered in the accessory registration list, the accessory identification information used to identify the accessory is outputted to the information updating section 208 as a changed item.

The information updating section 208 additionally writes the accessory identification information indicated by the changed item inputted from the detecting section 209, while remaining information in the software-specific information stored in the storage section 202 in advance, in the software-specific information. Hereinafter, an example of detailed processes of the information updating section 208 will be described with reference to FIG. 37.

Figure 37:
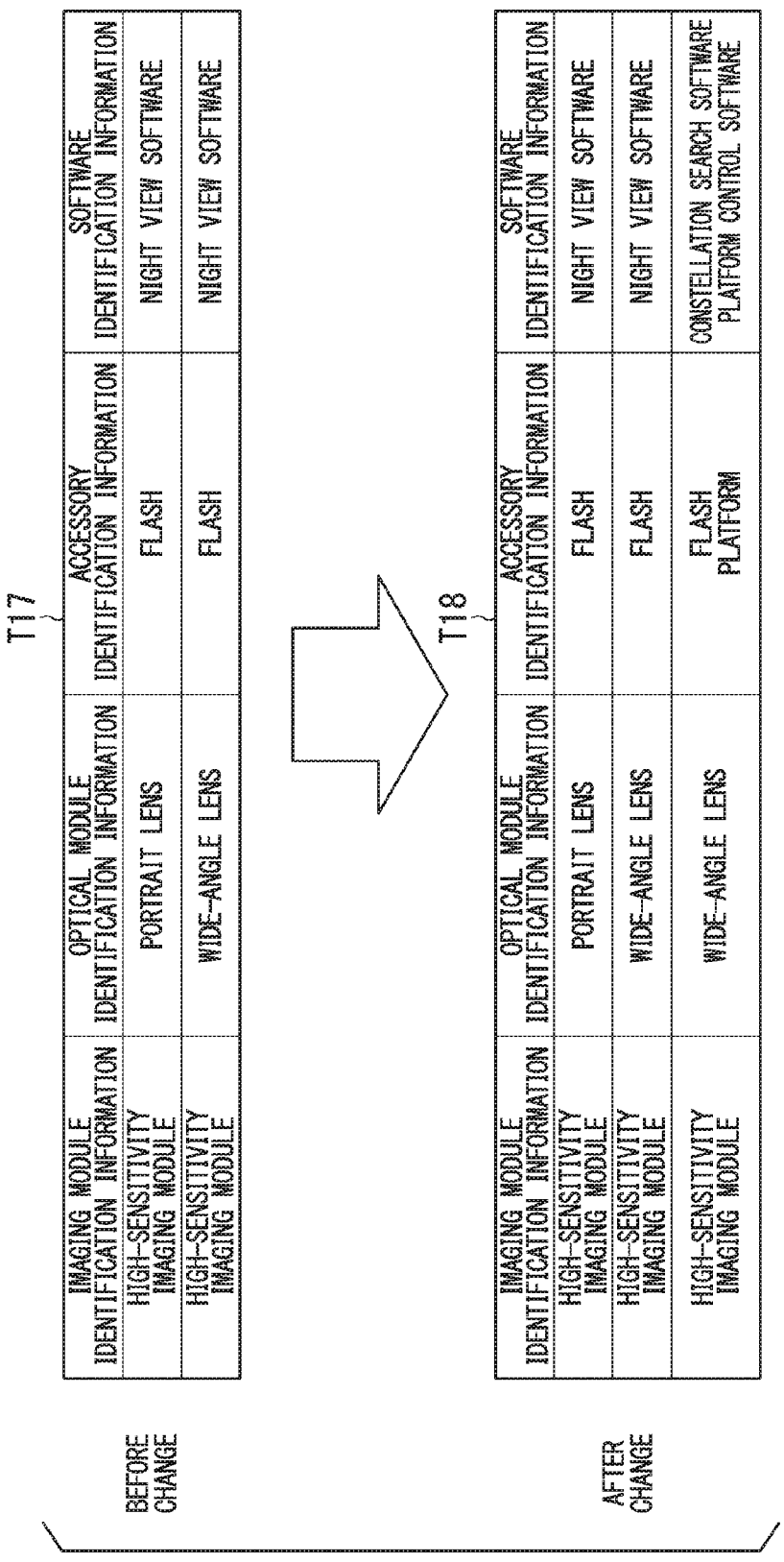
FIG. 37 is a diagram illustrating a process of updating software-specific information by an information updating section.

FIG. 37 is a diagram illustrating a process in updating software-specific information by the information updating section 208. A table T17 indicating software-specific information before being changed by the information updating section 208 is shown in FIG. 37. Further, a table T18 indicating software-specific information after being changed by the information updating section 208 is also shown in FIG. 37. Here, in the table T18 after change, information on the third line is added compared with the table T17. On the third line, with respect to a high-sensitivity imaging module and a wide-angle lens, a platform in addition to a flash is shown as accessory identification information. Further, the software identification information is replaced to constellation search software and platform control software, instead of night view software.

As described above, when the imaging module 302 is the high-sensitivity imaging module, the optical module 301 is the wide-angle lens and the accessory 303 is the flash, and when the platform is added as another accessory, the information updating section 208 adds a new line to the table T17, and generates a set where the imaging module identification information is the high-sensitivity imaging module, the optical module identification information is the wide-angle lens and the accessory identification information is the flash and the platform. Further, the information updating section 208 sets the software identification information to the constellation search software and the platform control software with respect to the combination of these modules and accessory. The information updating section 208 may set the software identification information to the default software. The information updating section 208 may set the software identification information by receiving a selection operation of arbitrary imaging and editing software from the user through the operating section 206.

As described above, the additional accessory is added to the current combination of modules, and the software-specific information (for example, information on the second line of the table T18) before the addition of the accessory also remains.

As described above, in Modification Example 3, the detecting section 209 detects that the accessory identification information that is not stored in the storage section 202 is received by the communicating section 201c. When the detecting section 209 detects that the accessory identification information that is not stored in the storage section 202 is received, the information updating section 208 updates the accessory identification information stored in the storage section 202. Thus, in addition to the effects of the second embodiment, even when a new accessory is used, the accessory identification information in the software-specific information is updated by the information updating section 208, and thus, it is not necessary for the user to update the accessory identification information in the software-specific information. Thus, it is possible to reduce an effort of the user for the addition of the accessory.

When the software extracting section 203 extracts two software identification information, the software starting section 104 may start imaging and editing software identified by the two software identification information. For example, the software starting section 104 may start the imaging operation software and the accessory operation software at the same time. Thus, the user can operate separately the imaging module 302 and the accessory 303, or can operate the imaging module 302 in association with the accessory 303.

A program used to execute the respective processes of the imaging operation terminal according to each embodiment may be recorded on a computer-readable recording medium, a computer system may read the program recorded on the recording medium to be executed, to thereby perform the above-described various processes relating to the imaging operation terminal.

Here, the "computer system" may include an OS and hardware such as peripherals. When using the WWW system, the "computer system" includes a home page providing environment (or display environment). The "computer-readable recording medium" includes a flexible disc, a magneto-optical disc, a ROM, a writable non-volatile memory such as a flash memory, a portable medium such as a CD-ROM, and a storage device such as a hard disk built in the computer system.

Further, the "computer-readable recording medium" includes a recording medium that retains a program for a predetermined time, such as a volatile memory (for example, a dynamic random access memory (DRAM)) inside a computer system that serves as a server or a client when a program is transmitted through a network such as the Internet or a communication line such as a telephone line. The program may be transmitted to a different computer system from the computer system in which the program is stored in the storage device or the like through a transmission medium or by transmission waves in the transmission medium. Here, the "transmission medium" that transmits the program refers to a medium having a function for transmitting information, such as a network (communication network) such as the Internet or a communication line (communication cable) such as a telephone line. The program may be a program for realizing a part of the above-described functions. Further, the program may be a program capable of realizing the above-described functions by combination with the program already recorded in the computer system, a so-called difference file (difference program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging operation terminal comprising:
a storage section that performs at least one of an operation, which is related to imaging of an imaging module that mounts an optical module, and an editing of an image imaged by the imaging module, the storage section storing a software identification information, which has a high possibility to be used when performing an imaging by a combination of the imaging module and the optical module and identifies an imaging and editing software, in association with each combination of an imaging module identification information for identifying the imaging module and an optical module identification information for identifying the optical module;
a communicating section which wirelessly receives the imaging module identification information used to identify the imaging module and the optical module identification information used to identify the optical module which is mounted to the imaging module from the imaging module when a wireless connection with the imaging module is established; and
a software extracting section which extracts the software identification information which corresponds to the combination of the imaging module identification information and the optical module identification information, which is received by the communicating section, from the storage section, wherein
the storage section stores the software identification information, which has a possibility greater than a predefined threshold to be used when performing an imaging of a specific subject or type of subject as an imaging target, estimated by a combination of the imaging module and the optical module and identifies the imaging and editing software.

2. An imaging operation terminal comprising:
a storage section that performs at least one of an operation, which is related to imaging of an imaging module that mounts an optical module, and an editing of an image imaged by the imaging module, the storage section storing a software identification information, which has a high possibility to be used when performing an imaging by a combination of the imaging module and the optical module and identifies an imaging and editing software, in association with each combination of an imaging module identification information for identifying the imaging module and an optical module identification information for identifying the optical module;
a communicating section which wirelessly receives the imaging module identification information used to identify the imaging module and the optical module identification information used to identify the optical module which is mounted to the imaging module from the imaging module when a wireless connection with the imaging module is established; and
a software extracting section which extracts the software identification information which corresponds to the combination of the imaging module identification information and the optical module identification information, which is received by the communicating section, from the storage section, wherein
the storage section stores the software identification information, which has a possibility greater than a predefined threshold to be used when performing an imaging in a specific photographing environment state in which the imaging is being performed, estimated by a combination of the imaging module and the optical module and identifies the imaging and editing software.

3. The imaging operation terminal according to claim 1, wherein
the storage section associates a set of the imaging module identification information, the optical module identification information, and the software identification information with accessory identification information for identifying an accessory used together with the imaging module to be stored,
the communicating section further receives, when receiving the imaging module identification information and the optical module identification information in a wireless manner, the accessory identification information for identifying the accessory used together with the imaging module, and
the software extracting section extracts, from the storage section, software identification information corresponding to a combination of the imaging module identification information, the optical module identification information, and the accessory identification information received by the communicating section.

4. The imaging operation terminal according to claim 3, wherein
the storage section associates a set of the imaging module identification information, the optical module identification information, and the software identification information with the accessory identification information that identifies at least one of a platform and a tripod.

5. An imaging system that includes an imaging module that mounts an optical module, and an imaging operation terminal that operates the imaging module, the imaging operation terminal comprising:
a storage section that performs at least one of an operation, which is related to imaging of the imaging module that mounts that optical module, and an editing of an image imaged by the imaging module, the storage section storing a software identification information, which has a high possibility to be used when performing an imaging by a combination of the imaging module and the optical module and identifies an imaging and editing software, in association with each combination of an imaging module identification information for identifying the imaging module and an optical module identification information for identifying the optical module;
a communicating section which wirelessly receives the imaging module identification information used to identify the imaging module and the optical module identification information used to identify the optical module which is mounted to the imaging module from the imaging module when a wireless connection with the imaging module is established; and
a software extracting section which extracts the software identification information which corresponds to the combination of the imaging module identification information and the optical module identification information, which is received by the communicating section, from the storage section, wherein
the storage section stores the software identification information, which has a possibility greater than a predefined threshold to be used when performing an imaging of a specific subject or type of subject as an imaging target, estimated by a combination of the imaging module and the optical module and identifies the imaging and editing software.

6. A software extraction method in an imaging operation method performed by an imaging operation terminal including a storage section that performs at least one of an operation, which is related to imaging of the imaging module that mounts that optical module, and an editing of an image imaged by the imaging module, the storage section storing a software identification information, which has a high possibility to be used when performing an imaging by a combination of the imaging module and the optical module and identifies an imaging and editing software, in association with each combination of an imaging module identification information for identifying the imaging module and an optical module identification information for identifying the optical module, the software extraction method comprising steps of:

receiving the imaging module identification information used to identify the imaging module and the optical module identification information used to identify the optical module which is mounted to the imaging module from the imaging module wirelessly by a communicating section when a wireless connection with the imaging module is established; and extracting the software identification information which corresponds to the combination of the imaging module identification information and the optical module identification information received by the communicating section from the storage section by a software extracting section, wherein the storage section stores the software identification information, which has a possibility greater than a predefined threshold to be used when performing an imaging of a specific subject or type of subject as an imaging target, estimated by a combination of the imaging module and the optical module and identifies the imaging and editing software.

7. A computer-readable device storing a program which causes an imaging operation terminal including a storage section that performs at least one of an operation, which is related to imaging of the imaging module that mounts that optical module, and an editing of an image imaged by the imaging module, the storage section storing a software identification information, which has a high possibility to be used when performing an imaging by a combination of the imaging module and the optical module and identifies an imaging and editing software, in association with each combination of an imaging module identification information for identifying the imaging module and an optical module identification information for identifying the optical module to perform steps of:

a communication step of receiving the imaging module identification information used to identify the imaging module and the optical module identification information used to identify the optical module which is mounted to the imaging module from the imaging module wirelessly when a wireless connection with the imaging module is established; and an extraction step of extracting the software identification information which corresponds to the combination of the imaging module identification information and the optical module identification information received in the communication step from the storage section, wherein the storage section stores the software identification information, which has a possibility greater than a predefined threshold to be used when performing an imaging of a specific subject or type of subject as an imaging target, estimated by a combination of the imaging module and the optical module and identifies the imaging and editing software.

8. The imaging operation terminal according to claim 2, wherein the storage section associates a set of the imaging module identification information, the optical module identification information, and the software identification information with accessory identification information for identifying an accessory used together with the imaging module to be stored, the communicating section further receives, when receiving the imaging module identification information and the optical module identification information in a wireless manner, the accessory identification information for identifying the accessory used together with the imaging module, and the software extracting section extracts, from the storage section, software identification information corresponding to a combination of the imaging module identification information, the optical module identification information, and the accessory identification information received by the communicating section.

9. The imaging operation terminal according to claim 8, wherein the storage section associates a set of the imaging module identification information, the optical module identification information, and the software identification information with the accessory identification information that identifies at least one of a platform and a tripod.

\* \* \* \* \*